United States Patent
Abe et al.

(10) Patent No.: US 12,410,348 B2
(45) Date of Patent: Sep. 9, 2025

(54) ISOCYANATE-BASED ADHESIVE

(71) Applicant: SIKA TECHNOLOGY AG, Baar (CH)

(72) Inventors: Megumi Abe, Hiratsuka (JP); Yuichi Matsuki, Hiratsuka (JP)

(73) Assignee: SIKA TECHNOLOGY AG, Baar (CH)

(*) Notice: Subject to any disclaimer, the term of this patent is extended or adjusted under 35 U.S.C. 154(b) by 920 days.

(21) Appl. No.: 17/624,889

(22) PCT Filed: Jul. 2, 2020

(86) PCT No.: PCT/JP2020/026085
§ 371 (c)(1),
(2) Date: Aug. 3, 2022

(87) PCT Pub. No.: WO2021/006187
PCT Pub. Date: Jan. 14, 2021

(65) Prior Publication Data
US 2022/0372352 A1 Nov. 24, 2022

(30) Foreign Application Priority Data
Jul. 5, 2019 (JP) ................. 2019-126348

(51) Int. Cl.
| | |
|---|---|
| *C09J 175/04* | (2006.01) |
| *C08G 18/10* | (2006.01) |
| *C08G 18/32* | (2006.01) |
| *C08G 18/48* | (2006.01) |
| *C08G 18/66* | (2006.01) |
| *C08G 18/73* | (2006.01) |
| *C08K 3/04* | (2006.01) |
| *C08K 3/26* | (2006.01) |
| *C09J 9/00* | (2006.01) |
| *C09J 11/04* | (2006.01) |

(52) U.S. Cl.
CPC ............ *C09J 175/04* (2013.01); *C08G 18/10* (2013.01); *C08G 18/3206* (2013.01); *C08G 18/4854* (2013.01); *C08G 18/6607* (2013.01); *C08G 18/73* (2013.01); *C09J 9/00* (2013.01); *C09J 11/04* (2013.01); *C08G 2170/00* (2013.01); *C08K 3/04* (2013.01); *C08K 2003/265* (2013.01); *C09J 2301/408* (2020.08)

(58) Field of Classification Search
None
See application file for complete search history.

(56) References Cited

U.S. PATENT DOCUMENTS

| | | |
|---|---|---|
| 2010/0048770 A1 | 2/2010 | Burckhardt |
| 2013/0102697 A1* | 4/2013 | Shinchi ............. C08G 18/4854 521/173 |
| 2017/0130106 A1 | 5/2017 | Matsuki et al. |
| 2017/0260434 A1 | 9/2017 | Matshuki |
| 2018/0223144 A1 | 8/2018 | Abe et al. |
| 2019/0030758 A1 | 1/2019 | Abe et al. |
| 2019/0030830 A1 | 1/2019 | Burckhardt |
| 2019/0136105 A1* | 5/2019 | Abe .................. C08G 18/3215 |
| 2021/0355355 A1* | 11/2021 | Matsuki ............. C09J 175/04 |

FOREIGN PATENT DOCUMENTS

| | | |
|---|---|---|
| CN | 107075338 A1 | 8/2017 |
| JP | 2005-336429 | 12/2005 |
| JP | 2010-522789 | 7/2010 |
| JP | 2014-025000 | 2/2014 |
| JP | 2017-082118 | 5/2017 |
| JP | 2017-128052 | 7/2017 |
| JP | 2017-128683 | 7/2017 |
| WO | WO 2008/116900 | 10/2008 |
| WO | WO 2017/022666 | 2/2017 |
| WO | WO 2017/126361 | 7/2017 |
| WO | WO 2017/126362 | 7/2017 |
| WO | WO-2017212824 A1 * | 12/2017 ......... C08G 18/3215 |
| WO | WO-2018025702 A1 * | 2/2018 ............ C08G 18/12 |
| WO | WO 2018/100674 A1 | 6/2018 |

OTHER PUBLICATIONS

International Search Report for International Application No. PCT/JP2020/026085 dated Sep. 15, 2020, 6 pages, Japan.

* cited by examiner

*Primary Examiner* — Katarzyna I Kolb
(74) *Attorney, Agent, or Firm* — Oliff PLC

(57) ABSTRACT

An embodiment of the present technology is an isocyanate-based adhesive used for a surface-treated crystalline thermoplastic resin base material, the isocyanate-based adhesive having a value represented by (JIS-A hardness)/(strength at break [MPa])×(elongation at break (%))/100 of 2.0 to 70 after being cured by being allowed to stand still under a condition at 23° C. and 50% RH for 3 days, and the crystalline thermoplastic resin base material having a value represented by $(\delta^d/\delta^p+\delta^p)$ of 2.0 to 30.0. $\delta^p=\gamma^p-\gamma^{p0}$ and $\delta^d=|\gamma^d-\gamma^{d0}|$, $\gamma^{p0}$ is a polar term of surface free energy before the surface treatment, $\gamma^p$ is a polar term of surface free energy after the surface treatment, $\gamma^{d0}$ is a dispersion term of the surface free energy before the surface treatment, and $\gamma^d$ is a dispersion term of the surface free energy after the surface treatment.

8 Claims, No Drawings

ISOCYANATE-BASED ADHESIVE

TECHNICAL FIELD

The present technology relates to an isocyanate-based adhesive.

BACKGROUND ART

In the related art, a steel plate has been used in interior and exterior members of an automobile such as a body, a front door, a rear door, a back door, a front bumper, a rear bumper, and a rocker molding of an automobile. However, a crystalline thermoplastic resin base material (hereinafter, "crystalline thermoplastic resin base material" is also simply referred to as "resin base material") such as a polypropylene resin base material has been increasingly used in part from the perspective of reducing the weight of an automobile.

In a case where a resin is used in interior and exterior members of an automobile in this way, a primer is usually applied to an adhering surface of a resin base material, and then an adhesive is applied to perform adhering. Furthermore, to omit the application of a primer, an adhering method in which a surface treatment is performed on a surface of a resin base material and then an adhesive is applied has been also proposed (e.g., Japan Unexamined Patent Publication No. 2014-025000).

In such circumstances, when the inventors of the present technology used various isocyanate-based adhesives to resin base materials that have been subjected to various surface treatments using Japan Unexamined Patent Publication No. 2014-025000 as a reference, it was found that adhesiveness (initial adhesiveness) and water-resistant adhesiveness or heat-resistant adhesiveness of the isocyanate-based adhesives were not always at satisfactory levels.

SUMMARY

The present technology provides an isocyanate-based adhesive exhibiting excellent adhesiveness, water-resistant adhesiveness, and heat-resistant adhesiveness.

The inventors of the present technology found that the balance between the physical properties when the isocyanate-based adhesive is cured in specific conditions and the surface conditions of the resin base material is important, and thus completed the present technology.

In other words, the present inventors have found the following configurations.

(1) An isocyanate-based adhesive used for a surface-treated crystalline thermoplastic resin base material,
  the isocyanate-based adhesive having a value represented by Formula (A) below of 2.0 to 70 after being cured by being allowed to stand still under a condition at 23° C. and 50% RH for 3 days, and
  the crystalline thermoplastic resin base material having a value represented by Formula (B) below of 2.0 to 30.0.
(2) The isocyanate-based adhesive according to (1) above, where
  the isocyanate-based adhesive contains a main agent containing a urethane prepolymer and a curing agent containing a tri- or higher functional polyol having a weight average molecular weight of 1000 or less,
  a ratio of a mixed amount of the curing agent to a mixed amount of the main agent is, in terms of mass ratio, 1.1 or less.
(3) The isocyanate-based adhesive according to (1) or (2) above, where the isocyanate-based adhesive contains at least one aliphatic isocyanate modified product selected from the group consisting of isocyanurates of aliphatic isocyanates, allophanates of aliphatic isocyanates, and biurets of aliphatic isocyanates.
(4) The isocyanate-based adhesive according to any one of (1) to (3) above, where the isocyanate-based adhesive contains a silane coupling agent.
(5) The isocyanate-based adhesive according to any one of (1) to (4) above, where the isocyanate-based adhesive contains carbon black or calcium carbonate.

As described below, according to an embodiment of the present technology, an isocyanate-based adhesive exhibiting excellent adhesiveness, water-resistant adhesiveness, and heat-resistant adhesiveness can be provided.

DETAILED DESCRIPTION

The isocyanate-based adhesive according to an embodiment of the present technology will be described below.

Note that in the present specification, numerical ranges indicated using "(from) . . . to . . . " include the former number as the lower limit value and the latter number as the upper limit value.

For each component, one type may be used alone, or a combination of two or more types may be used. Here, when two or more types for each of the components are used in combination, the content of the corresponding component refers to the total content unless otherwise specified.

Furthermore, in a case where the isocyanate-based adhesive according to an embodiment of the present technology is a two-part isocyanate-based adhesive containing a main agent and a curing agent, the content of each component in the isocyanate-based adhesive according to an embodiment of the present technology refers to the content with respect to the total amount of the main agent and the curing agent.

The isocyanate-based adhesive according to an embodiment of the present technology is an isocyanate-based adhesive that is used for a surface-treated crystalline thermoplastic resin base material, the isocyanate-based adhesive having a value represented by Formula (A) below of 2.0 to 70 after being cured by being allowed to stand still under a condition at 23° C. and 50% RH (relative humidity) for 3 days, and the crystalline thermoplastic resin base material having a value represented by Formula (B) below of 2.0 to 30.0.

Isocyanate-Based Adhesive

The isocyanate-based adhesive is not particularly limited as long as the isocyanate-based adhesive is an isocyanate-based adhesive having a value represented by Formula (A) below of 2.0 to 70 after being cured by being allowed to stand still under a condition at 23° C. and 50% RH for 3 days (hereinafter, also referred to as "adhesive according to an embodiment of the present technology").

From the perspective of achieving superior adhesiveness, adhesion durability (e.g., strength after being heated at 70° C. for 10 minutes), water-resistant adhesiveness, and heat-resistant adhesiveness, the isocyanate-based adhesive is preferably a one-part isocyanate-based adhesive or a two-part isocyanate-based adhesive, and more preferably a two-part isocyanate-based adhesive. Hereinafter, "achieving superior adhesiveness, adhesion durability (e.g., strength after being heated at 70° C. for 10 minutes), water-resistant adhesiveness, and heat-resistant adhesiveness" is also referred to as "achieving superior effects of the present technology".

From the perspective of achieving superior effects of the present technology, the isocyanate-based adhesive is preferably a urethane-based adhesive.

Note that the isocyanate-based adhesive means an adhesive containing an isocyanate (compound having an isocyanate group). Furthermore, the urethane-based adhesive means an adhesive containing a urethane (compound having a urethane bond).

Examples of the one-part isocyanate-based adhesive include a moisture-curable adhesive containing a urethane prepolymer.

Examples of the two-part isocyanate-based adhesive include an adhesive containing a main agent containing a urethane prepolymer, and a curing agent containing a polyol.

Urethane Prepolymer

An example of a preferable aspect is one in which the urethane prepolymer is a urethane prepolymer having a plurality of isocyanate groups at molecular terminals in each molecule.

As the urethane prepolymer, a known urethane prepolymer can be used. For example, a reaction product obtained by reacting polyisocyanate with a compound having at least two active hydrogen-containing groups per molecule (hereinafter, also referred as "active hydrogen compound") in a manner that the amount of the isocyanate group is in excess relative to the amount of the active hydrogen-containing groups, or the like can be used.

In an embodiment of the present technology, "active hydrogen-containing group" indicates "group containing an active hydrogen". Examples of the active hydrogen-containing group include a hydroxy group, an amino group, and an imino group.

Polyisocyanate

The polyisocyanate used during production of the urethane prepolymer is not particularly limited as long as the polyisocyanate has two or more isocyanate groups in each molecule.

Examples of the polyisocyanate include aromatic polyisocyanates, such as tolylene diisocyanate (TDI; e.g., 2,4-tolylene diisocyanate and 2,6-tolylene diisocyanate), diphenylmethane diisocyanate (MDI; e.g., 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates, such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); carbodiimide-modified polyisocyanates thereof; and isocyanurate-modified polyisocyanates, and allophanate modified products.

The polyisocyanate is preferably an aromatic polyisocyanate and more preferably an MDI from the perspective of achieving excellent curability.

A single polyisocyanate can be used or a combination of two or more polyisocyanates can be used.

Active Hydrogen Compound

The compound having two or more active hydrogen-containing groups per molecule (active hydrogen compound) that is used in the production of the urethane prepolymer is not particularly limited. Examples of the active hydrogen-containing group include a hydroxy (OH) group, an amino group, and an imino group.

Preferred examples of the active hydrogen compound include polyols having two or more hydroxy (OH) groups per molecule, and polyamine compounds having two or more selected from the group consisting of amino groups and imino groups per molecule. Among these, a polyol is preferable.

The active hydrogen compound may be used alone, or a combination of two or more types of the active hydrogen compounds may be used.

Content

From the perspective of achieving superior effects of the present technology, the content of the urethane prepolymer in the adhesive according to an embodiment of the present technology is preferably from 10 to 95 mass %, and more preferably from 20 to 60 mass %, in the adhesive according to an embodiment of the present technology.

Polyol

The polyol is not particularly limited as long as the polyol is a compound having two or more OH groups (i.e., bifunctional or higher). Specific examples of the polyol include polyether polyols; polyester polyols; acrylic polyols; polybutadiene polyols, and hydrogenated polybutadiene polyols; low-molecular-weight polyhydric alcohols; and mixed polyols of these. Among these, from the perspective of achieving superior effects of the present technology, a polyether polyol is preferred.

Specific examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), and polytetraethylene glycol. Among these, from the perspective of achieving superior effects of the present technology, polyoxypropylene diol (polypropylene glycol; PPG), polyoxypropylene triol, ethylene oxide/propylene oxide copolymer are preferred, and polyoxypropylene triol is more preferred.

From the perspective of achieving superior effects of the present technology, the polyol is preferably a trifunctional polyol (i.e., polyol having three or more OH groups), and more preferably polyoxypropylene triol.

From the perspective of achieving superior effects of the present technology, the weight average molecular weight (Mw) of the polyol is preferably 1000 or less. Although the lower limit of the Mw is not particularly limited, the lower limit is preferably 100 or more from the perspective of achieving superior effects of the present technology.

Note that, in the present specification, the weight average molecular weight is a value obtained by GPC analysis (solvent: tetrahydrofuran (THF)) based on calibration with polystyrene.

From the perspective of achieving superior effects of the present technology, the polyol is preferably a tri- or higher functional polyol having a weight average molecular weight of 1000 or less (hereinafter, also referred to as "specific polyol").

Content

From the perspective of achieving superior effects of the present technology, the content of the polyol in the adhesive according to an embodiment of the present technology is preferably from 1 to 90 mass %, and more preferably from 5 to 50 mass %, in the adhesive according to an embodiment of the present technology.

Mixing Ratio

In a case where the adhesive according to an embodiment of the present technology is a two-part isocyanate-based adhesive containing a main agent containing a urethane prepolymer and a curing agent containing a polyol, the ratio of the mixed amount of the curing agent to the mixed amount of the main agent (curing agent/main agent) is, in terms of mass ratio, preferably 1.1 or less from the perspective of achieving superior effects of the present technology. The lower limit of the ratio (curing agent/main agent) is not particularly limited; however, from the perspective of achieving superior effects of the present technology, the lower limit is preferably 0.01 or more, and more preferably 0.05 or more.

Furthermore, in a case where the adhesive according to an embodiment of the present technology is a two-part isocyanate-based adhesive containing a main agent containing a urethane prepolymer and a curing agent containing a polyol, the molar ratio of the isocyanate group (NCO group) contained in the urethane prepolymer to the OH group contained in the polyol (NCO/OH) is preferably from 0.2 to 10.0, and more preferably from 1.0 to 2.5, from the perspective of achieving superior effects of the present technology.

The content of the polyol in the adhesive according to an embodiment of the present technology is not particularly limited; however, from the perspective of achieving superior effects of the present technology, the content is preferably from 5 to 120 mass %, and more preferably from 10 to 100 mass %, with respect to the content of the urethane prepolymer.

Other Components

The adhesive according to an embodiment of the present technology may further contain other components besides the components described above.

In a case of a two-part type, whether the other components are added to the main agent or the curing agent can be selected appropriately.

As such other components, for example, various additives such as fillers (e.g., carbon black, calcium carbonate), modified products of aliphatic isocyanates (e.g., isocyanurates, allophanates, biurets), catalysts (curing catalysts), plasticizers, anti-aging agents, antioxidants, silane coupling agents, pigments (dyes), adhesion-imparting agents, terpene compounds such as terpineol, thixotropic agents, UV absorbents, flame retardants, surfactants (including leveling agents), dispersants, dehydrating agents, and antistatic agents can be further contained.

Note that, for example, the filler may be subjected to surface treatment by at least one treatment agent selected from the group consisting of fatty acid, resin acid, a urethane compound, and fatty acid ester.

Furthermore, when the adhesive according to an embodiment of the present technology is the two-part adhesive, whether the optional components are added to the main agent or the curing agent can be selected appropriately.

From the perspective of achieving superior effects of the present technology, the adhesive according to an embodiment of the present technology preferably contains no terpene compounds.

Modified Product of Aliphatic Isocyanate

From the perspective of achieving superior effects of the present technology, the adhesive according to an embodiment of the present technology preferably contains at least one aliphatic isocyanate modified product selected from the group consisting of isocyanurates (nurates) of aliphatic isocyanates, allophanates of aliphatic isocyanates, and biurets of aliphatic isocyanates.

The content of the modified product of aliphatic isocyanate in the adhesive according to an embodiment of the present technology is not particularly limited; however, from the perspective of achieving superior effects of the present technology, the content is preferably from 0.1 to 10 mass %, and more preferably from 0.5 to 5 mass %, in the adhesive according to an embodiment of the present technology.

The content of the modified product of aliphatic isocyanate in the adhesive according to an embodiment of the present technology is not particularly limited; however, from the perspective of achieving superior effects of the present technology, the content is preferably from 1 to 20 mass %, and more preferably from 2 to 10 mass %, with respect to the content of the urethane prepolymer.

Silane Coupling Agent

The adhesive according to an embodiment of the present technology preferably contains a silane coupling agent from the perspective of achieving superior effects of the present technology.

The content of the silane coupling agent in the adhesive according to an embodiment of the present technology is not particularly limited; however, from the perspective of achieving superior effects of the present technology, the content is preferably from 0.01 to 10 mass %, and more preferably from 0.1 to 5 mass %, with respect to the content of the urethane prepolymer.

Carbon Black

From the perspective of achieving superior effects of the present technology, the adhesive according to an embodiment of the present technology preferably contains carbon black.

The carbon black is not particularly limited. Examples of the carbon black include Super Abrasion Furnace (SAF), Intermediate Super Abrasion Furnace (ISAF), High Abrasion Furnace (HAF), Fast Extruding Furnace (FEF), General Purpose Furnace (GPF), Semi-Reinforcing Furnace (SRF), Fine Thermal (FT), and Medium Thermal (MT).

Specifically, SEAST 9 (available from Tokai Carbon Co., Ltd.) as the SAF, Showa Black N 220 (available from Showa Cabot K.K.) as the ISAF, SEAST 3 (available from Tokai Carbon Co., Ltd.) and Niteron #200 (available from NSCC Carbon Co., Ltd.) as the HAF, and HTC #100 (available from Chubu Carbon K.K.) as the FEF are exemplified. Additionally, Asahi #55 (available from Asahi Carbon Co., Ltd.) and SEAST 5 (available from Tokai Carbon Co., Ltd.) as the GPF, Asahi #50 (available from Asahi Carbon Co., Ltd.) and Mitsubishi #5 (available from Mitsubishi Chemical Corporation) as the SRF, Asahi Thermal (available from Asahi Carbon Co., Ltd.) and HTC #20 (available from Chubu Carbon K.K.) as the FT, Asahi #15 (available from Asahi Carbon Co., Ltd.) as the MT, and the like are exemplified.

The content of the carbon black in the adhesive according to an embodiment of the present technology is not particularly limited; however, from the perspective of achieving superior effects of the present technology, the content is preferably from 30 to 70 mass %, and more preferably from 40 to 60 mass %, with respect to the content of the urethane prepolymer.

Calcium Carbonate

From the perspective of achieving superior effects of the present technology, the adhesive according to an embodiment of the present technology preferably contains calcium carbonate.

The calcium carbonate is not particularly limited. Examples of the calcium carbonate include heavy calcium carbonate, precipitated calcium carbonate (light calcium carbonate), and colloidal calcium carbonate.

The content of the calcium carbonate in the adhesive according to an embodiment of the present technology is not particularly limited; however, from the perspective of achieving superior effects of the present technology, the content is preferably from 20 to 150 mass %, more preferably from 20 to 120 mass %, and even more preferably from 30 to 70 mass %, with respect to the content of the urethane prepolymer.

Catalyst (Curing Catalyst)

From the perspective of achieving superior effects of the present technology, the adhesive according to an embodiment of the present technology preferably contains a curing catalyst.

The curing catalyst is not particularly limited, and specific examples of the curing catalyst include carboxylic acids such as 2-ethylhexanoic acid and oleic acid; phosphoric acids such as polyphosphoric acid, ethyl acid phosphate, and butyl acid phosphate; bismuth catalysts such as bismuth octylate; tin catalysts such as dibutyltin dilaurate and dioctyltin dilaurate; and tertiary amine catalysts such as 1,4-diazabicyclo[2.2.2]octane, 2,4,6-tris(dimethylaminomethyl)phenol (for example, DMP-30), and compounds having a dimorpholinodiethyl ether structure.

From the perspective of achieving superior adhesiveness, the curing catalyst preferably has a dimorpholinodiethyl ether structure.

The dimorpholinodiethyl ether structure is a structure including dimorpholinodiethyl ether as a basic backbone.

In the dimorpholinodiethyl ether structure, a hydrogen atom in a morpholine ring may be substituted with a substituent. The substituent is not particularly limited. Examples of the substituent include an alkyl group. Examples of the alkyl group include a methyl group and an ethyl group.

The curing catalyst can be used alone or in combination of two or more types thereof.

The content of the curing catalyst in the adhesive according to an embodiment of the present technology is not particularly limited; however, from the perspective of achieving superior effects of the present technology, the content is preferably from 0.05 to 2.0 mass %, and more preferably from 0.1 to 0.5 mass %, with respect to the content of the urethane prepolymer.

Plasticizer

From the perspective of achieving superior effects of the present technology, the adhesive according to an embodiment of the present technology preferably contains a plasticizer.

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types of these may be used in combination.

The content of the plasticizer in the adhesive according to an embodiment of the present technology is not particularly limited; however, from the perspective of achieving superior effects of the present technology, the content is preferably from 1 to 50 mass %, and more preferably from 5 to 40 mass %, with respect to the content of the urethane prepolymer.

Formula (A)

As described above, the adhesive according to an embodiment of the present technology has a value represented by Formula (A) below of 2.0 to 70 after being cured by being allowed to stand still under an environment at 23° C. and 50% RH for 3 days (hereinafter, also referred to as "specific curing"). Hereinafter, "value represented by Formula (A)" is also simply referred to as "Formula (A)".

Formula $(A)$=(JIS-A hardness)/(strength at break [MPa])×(elongation at break (%))/100

Formula (A) is a value obtained by, for the adhesive after the curing, dividing the JIS (Japanese Industrial Standard)-A hardness by the strength at break [MPa], multiplying the obtained value by the elongation at break (%), and then dividing the obtained value by 100.

JIS-A Hardness

The JIS-A hardness is hardness measured using a type A durometer under an environment at a temperature of 20° C. and 55% RH in accordance with the durometer hardness test stipulated in JIS K 6253.

From the perspective of achieving superior effects of the present technology, the JIS-A hardness is preferably from 10 to 90, more preferably from 20 to 85, even more preferably from 30 to 80, and particularly preferably from 40 to 70.

Strength at Break

The strength at break is a strength at break when a tensile test was performed in accordance with JIS K 6850:1999 (under an environment at 20° C. and 50% RH at a pulling speed of 50 mm/min).

From the perspective of achieving superior effects of the present technology, the strength at break is preferably from 0.1 to 100 MPa, and more preferably from 1 to 50 MPa.

Elongation at Break

The elongation at break is an elongation at break when a tensile test was performed in accordance with JIS K 6850: 1999 (under an environment at 20° C. and 50% RH at a pulling speed of 50 mm/min).

From the perspective of achieving superior effects of the present technology, the elongation at break is preferably from 10 to 1000%, more preferably from 50 to 800%, and even more preferably from 100 to 500%.

Preferred Embodiment

From the perspective of achieving superior effects of the present technology, Formula (A) is preferably from 5 to 60, more preferably from 10 to 50, and even more preferably from 20 to 40.

Examples of the method of obtaining the isocyanate-based adhesive having Formula (A) of 2.0 to 70 after the specific curing include a method of obtaining the isocyanate-based adhesive having Formula (A) in a range of 2.0 to 70 by evaluating JIS-A hardness, strength at break, and elongation at break after the specific curing for various isocyanate-based adhesives for which types and amounts of components have been varied and then determining Formula (A).

Crystalline Thermoplastic Resin Base Material

As described above, the adhesive according to an embodiment of the present technology described above is used for a surface-treated crystalline thermoplastic resin base material (resin base material). Note that, the resin base material has a value represented by Formula (B) described below of 2.0 to 30.0.

Hereinafter, a surface-treated resin base material having a value represented by Formula (B) described below of 1.0 to 10 is also referred to as "resin base material according to an embodiment of the present technology".

Material

Specific examples of the raw material of resin base material according to an embodiment of the present technology include a polyolefin resin such as polyethylene, polypropylene, and polybutylene; a methacrylic resin such as polymethyl methacrylate; a polystyrene resin such as polystyrene, ABS, and AS; a polyester resin such as polyethylene terephthalate (PET), polybutylene terephthalate (PBT), polytrimethylene terephthalate, polyethylene naphthalate (PEN), and poly 1,4-cyclohexyldimethylene terephthalate (PCT); a polyamide resin selected from a nylon resin and a nylon copolymer resin such as polycaproamide (nylon 6), polyhexamethylene adipamide (nylon 66), polyhexamethylene sebacamide (nylon 610), polyhexamethylene dodecamide (nylon 612), polydodecanamide (nylon 12), polyhexamethylene terephthalamide (nylon 6T), polyhexamethylene isophthalamide (nylon 6I), a polycaproamide/polyhexamethylene terephthalamide copolymer (nylon 6/6T), a polyhexamethylene adipamide/polyhexamethylene terephthalamide copolymer (nylon 66/6T), and a polyhexamethylene adipamide/polyhexamethylene isophthalamide copolymer (nylon 66/6I); a polyvinyl chloride resin; polyoxymethylene (POM); a polycarbonate (PC) resin; a polyphenylene sulfide (PPS) resin; a modified polyphenylene ether (PPE) resin; a polyetherimide (PEI) resin; a polysulfone (PSF) resin; a polyethersulfone (PES) resin; a polyketone resin; a polyether nitrile (PEN) resin; a polyether ketone (PEK) resin; a polyether ether ketone (PEEK) resin; a polyetherketoneketone (PEKK) resin; a polyimide (PI) resin; a polyamide-imide (PAI) resin; a fluororesin; and modified resins obtained by modifying these resins or mixtures of these resins. Among these, from the perspective of achieving superior effects of the present technology, a polyolefin resin is preferred, polyethylene and polypropylene are more preferred, and polypropylene is even more preferred. The resin base material according to an embodiment of the present technology may contain two or more types of resins.

Surface Treatment

For the resin base material according to an embodiment of the present technology, the surface treatment performed on the resin base material is not particularly limited as long as the value represented by Formula (B) described below is in a range of 2.0 to 30.0. From the perspective of achieving superior effects of the present technology, the surface treatment is preferably at least one selected from the group consisting of corona treatment, plasma treatment, flame treatment, ITRO treatment, UV treatment (UV irradiation treatment), and excimer treatment, more preferably flame treatment, plasma treatment, corona treatment, and ITRO treatment, and even more preferably flame treatment and plasma treatment.

Flame Treatment

The flame treatment is a method for treating a surface by using a flame.

As the flame treatment, a known method such as a method of using a burner can be used.

The gas pressure of the flame treatment is preferably from 0.005 to 10 MPa, and more preferably from 0.01 to 1.5 MPa.

The rate of the flame treatment is preferably from 100 to 2000 mm/sec, and more preferably from 200 to 1000 mm/sec.

In a case where the flame treatment is performed by using a burner, the distance between the burner and the surface of the resin base material is preferably from 10 to 600 mm, and more preferably from 20 to 400 mm.

Plasma Treatment

The plasma treatment is a method of treating a surface by plasma discharge.

The plasma treatment is not particularly limited, and examples thereof include plasma treatment at an atmospheric pressure and vacuum plasma treatment.

The plasma gas (process gas) used for the plasma treatment is not particularly limited, and examples thereof include a nitrogen gas, a helium gas, an argon gas, and a mixed gas in which one or more of an oxygen gas, a carbon dioxide gas, or a hydrogen gas has been mixed to these gases.

The rate of the plasma treatment is preferably from 10 to 1500 mm/sec, and more preferably from 50 to 1000 mm/sec.

In a case where the plasma treatment is performed by using a plasma discharge nozzle, the distance between the plasma discharge nozzle and the surface of the resin base material is preferably from 1 to 100 mm, and more preferably from 5 to 50 mm.

UV Treatment

The UV treatment is a method for treating a surface by ultraviolet (UV) irradiation.

From the perspective of achieving superior effects of the present technology, the duration of the irradiation of UV is preferably 20 seconds or longer, more preferably 60 seconds or longer, even more preferably 90 seconds or longer, and particularly preferably 120 seconds or longer. From the perspective of achieving superior effects of the present technology, the upper limit is preferably 900 seconds or less, and more preferably 300 seconds or less.

In a case where the UV treatment is performed by using a UV irradiation device, the distance between the UV treatment device and the surface of the resin base material is preferably from 1 to 100 mm, and more preferably from 5 to 50 mm.

Corona Treatment

The corona treatment is a method of treating a surface by corona discharge.

From the perspective of achieving superior effects of the present technology, the rate of the corona treatment is preferably from 10 to 1000 mm/sec, and more preferably from 20 to 500 mm/sec.

In a case where the corona treatment is performed by using a corona discharge nozzle, the distance between the corona discharge nozzle and the surface of the resin base material is preferably from 1 to 100 mm, and more preferably from 5 to 50 mm, from the perspective of achieving superior effects of the present technology.

ITRO Treatment

The ITRO treatment involves introducing a silane compound into a fuel gas in order to form a flame and using the flame to treat the surface, thereby forming a nano-level silicon oxide film on the surface and improving adhesive properties between the surface and the adhesive.

The gas pressure of the ITRO treatment is preferably from 0.005 to 10 MPa from the perspective of achieving superior effects of the present technology, and more preferably from 0.01 to 1.5 MPa from the perspective of achieving superior effects of the present technology.

From the perspective of achieving superior effects of the present technology, the rate of the ITRO treatment is preferably from 100 to 2000 mm/sec, and more preferably from 200 to 1000 mm/sec.

In a case where the ITRO treatment is performed by using a burner, the distance between the burner and the surface of the resin base material is preferably from 1 to 600 mm, and more preferably from 20 to 400 mm from the perspective of achieving superior effects of the present technology.

Formula (B)

As described above, the resin base material according to an embodiment of the present technology has a value represented by Formula (B) below of 2.0 to 30.0. Hereinafter, "value represented by Formula (B)" is also simply referred to as "Formula (B)".

$$\text{Formula }(B)=\delta^d/\delta^p+\delta^p$$

Note that $\delta^p = \gamma^p - \gamma^{p0}$ and $\delta^d = |\gamma^d - \gamma^{d0}|$, $\gamma^{p0}$ is a polar term of surface free energy of the crystalline thermoplastic resin base material before the surface treatment, $\gamma^p$ is a polar term of the surface free energy of the crystalline thermoplastic resin base material after the surface treatment, $\gamma^{d0}$ is a dispersion term of the surface free energy of the crystalline thermoplastic resin base material before the surface treatment, and $\gamma^d$ is a dispersion term of the surface free energy of the crystalline thermoplastic resin base material after the surface treatment.

Formula (B) is a sum of a value obtained by dividing $\delta^d$ by $\delta^p$ and $\delta^p$.

Furthermore, $\delta^p$ is a value obtained by subtracting $\gamma^{p0}$ from $\gamma^p$.

Furthermore, $\delta^d$ is an absolute value of the difference between $\gamma^d$ and $\gamma^{d0}$.

From the perspective of achieving superior effects of the present technology, $\delta^p$ is preferably from 1 to 50, and more preferably from 5 to 20.

From the perspective of achieving superior effects of the present technology, $\delta^d$ is preferably from 1 to 20, and more preferably from 2 to 10.

Preferred Embodiment (1)

From the perspective of achieving superior effects of the present technology, Formula (B) is preferably from 5.0 to 20.0, and more preferably from 10.0 to 15.0.

Preferred Embodiment (2)

In a case where the surface temperature at the time of the surface treatment is not lower than a temperature that is 50° C. lower than the starting temperature of an endothermic peak obtained by differential scanning calorimetry (DSC) of the resin base material (resin base material before the surface treatment), Formula (B) is preferably from 5.0 to 30.0, more preferably from 10.0 to 25.0, and even more preferably from 10.0 to 15.0 from the perspective of achieving superior effects of the present technology.

Furthermore, in a case where the surface temperature at the time of the surface treatment is lower than a temperature that is 50° C. lower than the starting temperature of an endothermic peak obtained by differential scanning calorimetry (DSC) of the resin base material (resin base material before the surface treatment), Formula (B) is preferably from 2.0 to 5.0 from the perspective of achieving superior effects of the present technology.

Note that the temperature that is 50° C. lower than the starting temperature of an endothermic peak obtained by the DSC is, for example, in a case of the resin base material 1 used in Examples described below, 70° C. (=120° C.-50° C.) since the starting temperature of the endothermic peak obtained by the DSC is 120° C.

Furthermore, the surface temperature at the time of the surface treatment can be measured by, for example, an attachable thermocouple, an ink and a sticker that change color based on heat, and thermography.

Determination of Surface Free Energy

Next, the method of determining surface free energy will be described.

The polar term and the dispersion term of the surface free energy of the resin base material can be determined in accordance with the Owens and Wendt method (J. Appl. Polym. Sci., 13, 1741-1747 (1969)).

That is, a liquid (test liquid) having known surface free energy is dropped on a resin base material surface, a contact angle is then measured, and the polar term and the dispersion term of the surface free energy of the resin base material are calculated by the equations (Equations (1) to (3) below) based on the Owens and Wendt analysis.

$$1+\cos\theta = 2[(\gamma^d \cdot \gamma_L^d)/\gamma_L^2]^{1/2} + 2[(\gamma^p \cdot \gamma_L^p)/\gamma_L^2]^{1/2} \quad \text{(Equation (1))}$$

$$\gamma = \gamma^d + \gamma^p \quad \text{Equation (2)}$$

$$\gamma_L = \gamma_L^d + \gamma_L^p \quad \text{Equation (3)}$$

Here, each symbol indicates the following.

$\theta$: contact angle with each test liquid $\gamma^d$: dispersion term of surface free energy of resin base material [mJm$^{-2}$]

$\gamma_L^d$: dispersion term of surface free energy of test liquid [mJm$^{-2}$]

$\gamma^p$: polar term of surface free energy of resin base material [mJm$^{-2}$]

$\gamma_L^p$: polar term of surface free energy of test liquid [mJm$^{-2}$]

In an embodiment of the present technology, water and diiodomethane (methylene iodide) are used as the test liquid. The surface free energies of water and diiodomethane to be used as the test liquids are as follows:

water: $\gamma_L^d = 21.8$ mJm$^{-2}$, $\gamma_L^p = 51.0$ mJm$^{-2}$ diiodomethane: $\gamma_L^d = 49.5$ mJm$^{-2}$, $\gamma_L^p = 1.3$ mJm$^2$ By introducing these numerical values to Equations (1) to (3) above and introducing the numerical value of the contact angles using test liquids to Equations described above, the polar term and the dispersion term of the surface free energy of the resin base material can be calculated.

Furthermore, the contact angle is measured by the θ/2 method based on the "sessile drop method" described in JIS R 3257, in which the test liquid was dropped on the resin base material surface at 25° C. and the waiting time from the contact of the droplet to the measurement is set to 5 seconds. As the measuring device of the contact angle, a portable contact angle meter (available from KRUSS) can be used.

Formula (B) above can be determined by calculating the polar term and the dispersion term of the surface free energy as described above for each of the resin base material before the surface treatment and the resin base material after the surface treatment.

Examples of the method of obtaining the surface-treated resin base material having Formula (B) of 2.0 to 30.0 include a method in which polar terms and dispersion terms of surface free energies before and after surface treatment are calculated for resin base materials undergone various surface treatments in which the raw materials of the resin base materials and the types and conditions of the surface treatments were changed, Formula (B) is then determined, and thus a surface-treated resin base material having Formula (B) in a range of 2.0 to 30.0 is obtained.

Application

Since the isocyanate-based adhesive according to an embodiment of the present technology has excellent adhesiveness, water-resistant adhesiveness, and heat-resistant adhesiveness, the isocyanate-based adhesive is particularly useful for interior and exterior members of an automobile, such as a body, a front door, a rear door, a back door, a front bumper, a rear bumper, and a rocker molding of an automobile.

Method for Producing Multilayer Structure

The method of producing the multilayer structure according to an embodiment of the present technology (hereinafter, also referred to as "production method according to an embodiment of the present technology") is a method of producing a multilayer structure including the following steps (1) to (3) in this order. Note that the production method according to an embodiment of the present technology may include another step besides the following steps (1) to (3).

(1) Surface Treatment

A step of applying surface treatment to a surface of a resin base material (2) Uncured Adhesive Layer Formation A step of obtaining a multilayer structure precursor having the resin base material and an uncured adhesive layer by applying the adhesive according to an embodiment of the present technology described above on the surface-treated resin base material.

(3) Curing

A step of obtaining a multilayer structure having the resin base material and a cured adhesive layer (hereinafter, "cured adhesive layer" is also simply referred to as "adhesive layer") by curing the uncured adhesive layer. Hereinafter, the steps will be described.

Surface Treatment

The surface treatment is a step of applying surface treatment to a surface of a resin base material.

The surface-treated resin base material is the resin base material according to an embodiment of the present technology described above. That is, the surface-treated resin base material has a value represented by Formula (B) above of 2.0 to 30.0.

Specific examples and preferred embodiments of the raw material of the resin base material are as described above.

Specific examples and preferred embodiments of the surface treatment are as described above.

Uncured Adhesive Layer Formation

The uncured adhesive layer formation is a step of obtaining a multilayer structure precursor having the resin base material and an uncured adhesive layer by applying the adhesive according to an embodiment of the present technology described above on the surface-treated resin base material obtained in the surface treatment described above (resin base material according to an embodiment of the present technology). The adhesive according to an embodiment of the present technology may be applied to the resin base material according to an embodiment of the present technology after a primer is applied.

A method of applying the adhesive according to an embodiment of the present technology on the surface-treated resin base material is not particularly limited, and examples of the method include a dip coating method, a coating method with a double roll coater, a slit coater, an air knife coater, a wire bar coater, a slide hopper, spray coating, a blade coater, a doctor coater, a squeeze coater, a reverse roll coater, a transfer roll coater, an extrusion coater, a curtain coater, a dip coater, a die coater, or a gravure roll, a screen printing method, a dip coating method, a spray coating method, a spin coating method, and an inkjet method.

The thickness of the uncured adhesive layer to be formed is not particularly limited and is preferably from 0.1 to 20 mm.

Adhering

The production method according to an embodiment of the present technology may further include, in between the uncured adhesive layer formation described above and the curing described below, a step of obtaining a multilayer structure precursor having the resin base material, the uncured adhesive layer, and a resin base material in this order by adhering another base material (preferably, another resin base material of the identical type, to which the surface treatment described above has been performed) (a primer may be applied) on another face of the uncured adhesive layer formed in the uncured adhesive layer formation described above.

Curing

The curing is a step of obtaining a multilayer structure having the resin base material and a cured adhesive layer (adhesive layer) (in a case where the adhering described above is included, a multilayer structure having the resin base material, the adhesive layer, and the resin base material) by curing the uncured adhesive layer formed in the uncured adhesive layer formation described above.

The method of curing the uncured adhesive layer is not particularly limited, and examples thereof include a method of allowing the uncured adhesive layer to stand still at room temperature and a method of heating the uncured adhesive layer.

The method of curing the uncured adhesive layer is not limited to the curing of Formula (A) described above (i.e., allowed to stand still under a condition at 23° C. and 50% RH for 3 days).

Examples

An embodiment of the present technology will be described in further detail below by way of examples. However, an embodiment of the present technology is not limited to these examples.

Preparation of Isocyanate-Based Adhesive

The components listed in rows of Main agent in Table 1 below were mixed in the proportions (part by mass) listed in the same table below.

The components listed in rows of Curing agent in the same table were mixed in the proportions (part by mass) listed in the same table below. In this manner, adhesives of 1-1, 1-2, 2-1, 2-2, 3, 4, 5, 6, 7, 8-1, and 8-2 were prepared.

Note that the adhesive containing both the main agent and the curing agent is a two-part adhesive and forms a urethane bond after curing. Furthermore, the adhesive containing only the main agent is a one-part adhesive and forms a urea bond after curing.

For example, 1-1 is a two-part adhesive since the adhesive contains both the main agent and the curing agent, and 1-2 is a one-part adhesive since the adhesive only contains the main agent.

Table 1 lists "JIS-A hardness", "strength at break [MPa]", and "elongation at break (%)" after curing (allowed to stand still under a condition at 23° C. and 50% RH for 3 days) of each adhesive. The measurement methods are as described above. Note that, in a case where the adhesive is a two-part adhesive, the main agent and the curing agent were mixed in the ratio listed in the row of "Main agent/curing agent (mass ratio)" of Table 1.

Furthermore, Table 1 lists Formula (A) of each adhesive.

TABLE 1

|  |  | 1-1 | 1-2 | 2-1 | 2-2 | 3 | 4 | 5 | 6 | 7 | 8-1 | 8-2 |
|---|---|---|---|---|---|---|---|---|---|---|---|---|
| Main agent | WS-222 | 100.0 | 100.0 | 96.5 | 96.5 |  | 99.9 |  |  |  | 96.9 | 96.9 |
|  | Urethane prepolymer 2 |  |  |  |  |  |  | 70.4 |  |  |  |  |
|  | Urethane prepolymer 3 |  |  |  |  | 53.0 |  |  | 51.5 | 53.0 |  |  |
|  | Isocyanurate 1 |  |  | 1.5 | 1.5 |  |  | 1.5 |  |  |  |  |
|  | Isocyanurate 2 |  |  |  |  |  |  |  | 1.5 |  |  |  |
|  | Allophanate 1 |  |  | 0.5 | 0.5 |  |  |  |  |  |  |  |
|  | Allophanate 2 |  |  |  |  |  |  |  |  |  | 2.15 | 2.15 |
|  | Biuret |  |  | 1.0 | 1.0 |  |  |  |  |  |  |  |
|  | Silane coupling agent 1 |  |  | 0.5 | 0.5 |  |  |  |  |  | 1 | 1 |
|  | Silane coupling agent 2 |  |  | 0.05 | 0.05 |  |  |  |  |  |  |  |
|  | Monool |  |  |  |  |  | 0.1 |  |  |  |  |  |
|  | Carbon black |  |  |  |  |  |  |  |  |  |  |  |
|  | Calcium carbonate 1 |  |  |  |  | 37.0 |  | 14.1 | 37.0 | 37.0 |  |  |
|  | Silica |  |  |  |  |  |  | 3.5 |  |  |  |  |
|  | Dehydrating agent |  |  |  |  | 10.0 |  |  | 10.0 | 10.0 |  |  |
|  | Plasticizer |  |  |  |  |  |  | 10.6 |  |  |  |  |
|  | Catalyst 1 |  |  |  |  |  |  |  |  |  |  |  |
|  | Total | 100.0 | 100.0 | 100.0 | 100.0 | 100.0 | 100.0 | 100.0 | 100.0 | 100.0 | 100.0 | 100.0 |
| Curing agent | Specific polyol 1 | 5.0 |  | 7.0 |  |  |  | 7.2 |  |  | 4.7 |  |
|  | Specific polyol 2 |  |  |  |  |  |  |  | 19.9 | 19.9 |  |  |
|  | Bifunctional polyol 1 |  |  |  |  |  |  | 46.3 |  |  |  |  |
|  | Bifunctional polyol 2 |  |  |  |  | 8.0 |  | 2.9 |  |  |  |  |
|  | Bifunctional polyol 3 |  |  |  |  | 9.9 |  |  | 9.9 | 9.9 |  |  |
|  | Bifunctional polyol 4 |  |  |  |  | 19.9 |  |  | 19.9 | 19.9 |  |  |
|  | Bifunctional polyol 5 |  |  |  |  |  |  |  |  |  | 27.1 |  |
|  | Bifunctional polyol 6 |  |  |  |  |  |  |  |  |  | 20.6 |  |
|  | Trifunctional polyol 1 | 47.9 |  | 45.9 |  |  | 52.9 |  |  |  |  |  |
|  | Trifunctional polyol 2 |  |  |  |  | 19.9 |  |  | 19.9 | 19.9 |  |  |
|  | Calcium carbonate 2 | 46.8 |  | 46.8 |  |  | 46.8 | 43.5 |  |  | 47.3 |  |
|  | Talc |  |  |  |  | 41.6 |  |  | 29.7 | 29.7 |  |  |
|  | Catalyst 2 | 0.3 |  | 0.3 |  |  | 0.3 |  |  |  |  |  |
|  | Catalyst 3 |  |  |  |  | 0.61 |  |  |  |  |  |  |
|  | Total | 100.0 |  | 100.0 |  | 100.0 | 100.0 |  |  |  |  |  |
|  | Main agent/curing agent (mass ratio) | 10/1 |  | 10/1 |  | 10/6.7 | 10/1 |  |  |  |  |  |
| Physical properties after curing | JIS-A hardness | 55 | 53 | 50 | 48 | 100 | 33 |  |  |  |  |  |
|  | Strength at break [MPa] | 6 | 6 | 5 | 5 | 20 | 2.5 |  |  |  |  |  |
|  | Elongation at break (%) | 400 | 450 | 300 | 350 | 35 | 650 |  |  |  |  |  |
|  | Formula (A) | 36.7 | 39.8 | 30.0 | 33.6 | 1.8 | 85.8 |  |  |  |  |  |

TABLE 1-continued

|  |  |  |  |  | 0.11 |  |
|---|---|---|---|---|---|---|
|  | Catalyst 2 |  |  |  | 0.11 |  |
|  | Catalyst 3 | 0.01 | 0.61 | 0.61 | 0.17 |  |
|  | Total | 100.0 | 100.0 | 100.0 | 100.0 |  |
|  | Main agent/curing agent (mass ratio) | 10/2.5 | 10/6.7 | 10/10 | 10/1 |  |
| Physical | JIS-A hardness | 70 | 100 | 90 | 35 | 55 |
| properties | Strength at break [MPa] | 50 | 20.0 | 19 | 3 | 6.0 |
| after curing | Elongation at break (%) | 150 | 50 | 45 | 600 | 250 |
|  | Formula (A) | 2.1 | 2.5 | 2.1 | 70.0 | 22.9 |

Details of each of the components in Table 1 are as follows.

- WS-222: A moisture-curable adhesive containing a urethane prepolymer (available from The Yokohama Rubber Co., Ltd.)
- Urethane prepolymer 2: A urethane prepolymer produced by mixing polytetramethylene glycol (PTMG 650, available from Mitsubishi Chemical Corporation; weight average molecular weight: 650), polyoxypropylene diol (SANNIX PP2000, available from Sanyo Chemical Industries, Ltd.: weight average molecular weight: 2000), and diphenylmethane diisocyanate (MDI) (Sumidur 44S, available from Sumika Bayer Urethane Co., Ltd.) in a manner that NCO/OH (molar ratio) was 2.0 and reacting the mixture under a condition at 80° C. for 5 hours
- Urethane prepolymer 3: A urethane prepolymer produced by mixing polyoxypropylene ethylene diol (EXCENOL 510, available from AGC Inc.; weight average molecular weight: 4000), polymeric MDI (MILLIONATE MR-200, available from Tosoh Corporation), and carbodiimide-modified MDI (MILLIONATE MTL, available from Tosoh Corporation) in a manner that NCO/OH (molar ratio) was 35.0 and reacting the mixture under a condition at 80° C. for 5 hours
- Isocyanurate 1: Isocyanurate of pentamethylene diisocyanate
- Isocyanurate 2: Isocyanurate of hexamethylene diisocyanate
- Allophanate 1: Allophanate of pentamethylene diisocyanate
- Allophanate 2: Allophanate of hexamethylene diisocyanate
- Biuret: Biuret of hexamethylene diisocyanate
- Silane coupling agent 1: N-phenyl-γ-aminopropyltrimethoxysilane
- Silane coupling agent 2: Triethoxysilylthiopropyltrimethoxysilane
- Monool: n-Octanol
- Carbon black: #200 MP, available from NSCC Carbon Co., Ltd.
- Calcium carbonate 1: Super S, available from Maruo Calcium Co., Ltd. (heavy calcium carbonate)
- Silica: AEROSIL R972, available from Nippon Aerosil Co., Ltd. (surface-treated fumed silica)
- Dehydrating agent: ZEOSIL A-4, available from Solvay Japan, Ltd. (zeolite)
- Plasticizer: Diisononyl phthalate (DINP), available from J-PLUS Co., Ltd.
- Catalyst 1: UCAT-660M, available from San-Apro Ltd. (dimorpholinodiethyl ether (DMDEE))
- Specific polyol 1: EXCENOL 450ED (polyoxypropylene tetraol (EO terminal); weight average molecular weight: 500), available from Asahi Glass Co., Ltd.
- Specific polyol 2: UNIOL TG-330 (polyoxypropylene glyceryl ether (triol); weight average molecular weight: 330), available from NOF Corporation
- Bifunctional polyol 1: PTMG-2000 (polytetramethylene glycol (diol); weight average molecular weight: 2000), available from Mitsubishi Chemical Corporation
- Bifunctional polyol 2: 14BG (1,4-butanediol; molecular weight: 90), available from Mitsubishi Chemical Corporation
- Bifunctional polyol 3: UNIOL D-400 (polyoxypropylene glycol (diol); weight average molecular weight: 400), available from NOF Corporation
- Bifunctional polyol 4: EXCENOL 3020 (polypropylene glycol (diol); weight average molecular weight: 3000), available from AGC Inc.
- Bifunctional polyol 5: Poly bd R-15HT (liquid polybutadiene diol; weight average molecular weight: 1200), available from Idemitsu Kosan Co., Ltd.
- Bifunctional polyol 6: D-6011 (rosin diol; weight average molecular weight: 1000), available from Arakawa Chemical Industries, Ltd.
- Trifunctional polyol 1: PREMINOL 7001K (polyoxypropylene triol (EO terminal); weight average molecular weight: 6500), available from Asahi Glass Co., Ltd.
- Trifunctional polyol 2: EXCENOL 823 (polypropylene ethylene glycol (triol); weight average molecular weight: 5000), available from AGC Inc.
- Calcium carbonate 2: KALFAIN 200 (calcium carbonate surface-treated with a fatty acid), available from Maruo Calcium Co., Ltd.
- Talc: Soapstone A (average particle size: 3.5 to 4.0 μm; aspect ratio: 9.5), available from Nihon Mistron Co., Ltd.
- Catalyst 2: U-810 (dioctyltin dilaurate), available from Nitto Kasei Co., Ltd.
- Catalyst 3: DABCO 33-LV (DABCO 33% propylene glycol solution), available from Sigma-Aldrich Production of Multilayer Structure Multilayer structures were produced as described below.

Surface Treatment

By performing surface treatments listed in Tables 2 to 4 below on surfaces of resin base materials 1 to 3 below, three types of surface-treated resin base materials used in each of Examples and Comparative Examples were obtained.

For example, for Example A1, a resin base material 1 that was subjected to the flame treatment 3, a resin base material 2 that was subjected to the flame treatment 3, and a resin base material 3 that was subjected to the flame treatment 3 were obtained.

Resin Base Material

Details of the resin base materials 1 to 3 before the surface treatment are as described below. Note that the resin base materials 1 to 3 all correspond to the crystalline thermoplastic resin base materials.

Resin base material 1: Talc-containing PP (polypropylene containing talc) resin base material (resin base material obtained by molding TSOP 6, available from Prime Polymer Co., Ltd.) (polar term $\gamma^{p0}$ of surface free energy: 0.2 mJm$^{-2}$; dispersion term $\gamma^{d0}$ of surface free energy: 30.2 mJm$^{-2}$) (starting temperature of endothermic peak obtained by DSC measurement: 120° C.)

Resin base material 2: PP-GF (glass fiber-containing polypropylene) resin base material (resin base material obtained by molding FUNCSTER, available from Japan Polypropylene Corporation) (polar term $\gamma^{p0}$ of surface free energy: 0.2 mJm$^{-2}$; dispersion term $\gamma^{p0}$ of surface free energy: 30.3 mJm$^{-2}$) (starting temperature of endothermic peak obtained by DSC measurement: 123° C.)

Resin base material 3: CFRTP (carbon fiber-reinforced thermoplastic resin) resin base material (polar term $\gamma^{p0}$ of surface free energy: 0.6 mJm$^{-2}$; dispersion term $\gamma^{d0}$ of surface free energy: 30.7 mJm$^{-2}$) (starting temperature of endothermic peak obtained by DSC measurement: 128° C.)

Surface Treatment

Details of surface treatments are as follows.

(1) Flame Treatment (Flame Treatments 1 to 6)

The flame treatment was performed by using a flame treatment device available from ARCO Gas (gas flow rate: 3.7 L/min (minute); air flow rate: 100 L/min (minute)) under conditions listed in Tables 2 to 3 (distance to base material, treatment speed, number of passes).

Here, treatment speed refers to the speed of the flame treatment, and is specifically the speed [mm/sec (second)] of the flame treatment device moved with respect to a base material. Furthermore, distance to base material refers to a distance between the flame treatment device and the base material [mm]. Additionally, number of passes refers to the number of times of sweeping of the flame. For example, the case where the number of passes is described as "1" means that the flame swept from one end to the other end of the base material once, and the case where the number of passes is described as "3" means that the flame swept from one end to the other end of the base material once, then swept from the other end to the one end of the base material once, and again swept from the one end to the other end of the base material once.

(2) Plasma Treatment (Plasma Treatment 1)

The plasma treatment was performed by using a plasma treatment device under conditions listed in Table 4 (distance to base material, treatment speed, number of passes).

Here, treatment speed refers to the speed of the plasma treatment, and is specifically the speed [mm/sec] of the plasma discharge nozzle moved with respect to a base material. Furthermore, distance to base material refers to a distance between the plasma discharge nozzle and the base material [mm]. Additionally, number of passes refers to the number of times of sweeping of the plasma discharge nozzle. For the plasma treatment 1, since the number of passes is "1", the plasma discharge nozzle (plasma discharge) swept from one end to the other end of the base material once.

(3) UV Treatment (UV Treatments 1 to 4)

The UV treatment was performed by using a UV irradiation device under conditions listed in Table 4 (distance to base material, irradiation time).

Note that distance to base material refers to a distance between the UV irradiation device and the base material [mm].

Uncured Adhesive Layer Formation

An uncured adhesive layer (thickness: 3 mm) was formed by applying the isocyanate-based adhesive obtained as described above on an entire surface of one side of each of the obtained surface-treated resin base material (width: 25 mm; length: 120 mm; thickness: 3 mm). Note that, in a case where the adhesive is a two-part adhesive, the main agent and the curing agent were mixed in the ratio listed in the rows of "Main agent/curing agent (mass ratio)" of Table 1 or Tables 2 to 4.

Adhering

Furthermore, a surface-treated resin base material (width: 25 mm; length: 120 mm; thickness: 3 mm) of the same type was adhered on the formed uncured adhesive layer.

For example, in Example A1, when an uncured adhesive layer was formed on a resin base material 1 which was subjected to the flame treatment 3, another resin base material 1 which was subjected to the flame treatment 3 was adhered on the formed uncured adhesive layer.

Furthermore, when the two surface-treated resin base materials were adhered, the two surface-treated resin base materials were arranged in a manner that the entirety of the facing faces of the two surface-treated resin base materials are substantially overlap each other.

As described above, a multilayer structure precursor having the resin base material, the uncured adhesive layer, and the resin base material in this order was obtained.

Curing

Next, a multilayer structure (initial multilayer structure) having the resin base material, the adhesive layer, and the resin base material in this order was obtained by curing the uncured adhesive layer by allowing the multilayer structure precursor to stand still under a condition at 23° C. and 50% RH for 3 days.

Three types of multilayer structures (initial multilayer structures) were obtained for each of Examples and Comparative Examples. For example, for Example A1, a multilayer structure that used a resin base material 1 as the resin base material before the surface treatment, a multilayer structure that used a resin base material 2 as the resin base material before the surface treatment, and a multilayer structure that used a resin base material 3 as the resin base material were obtained.

Various Tests

The following various tests were performed using each of the initial multilayer structures obtained as described above.

Water Resistance Test

The water resistance test in which each of the initial multilayer structures obtained as described above was immersed in water at 50° C. for 2 weeks was performed. After the water resistance test, the multilayer structure was taken out from the water and used as a multilayer structure for water-resistant adhesiveness evaluation.

Heat Resistance Test

The heat resistance test in which each of the initial multilayer structures obtained as described above was left to stand under a condition at 90° C. in the air for 2 weeks was performed. A multilayer structure for the heat resistance test was used as a multilayer structure for heat-resistant adhesiveness evaluation.

Evaluation

The following evaluations were performed for each of the obtained multilayer structures.

Peel Test

A cut was formed on the adhesive layer of each of the initial multilayer structures obtained as described above (number of samples for each: 10) by a knife, and a peel test in which two resin base materials of the initial multilayer structure is peeled by hands, and released faces after the peel test were visually observed.

The peel test was performed in the manner identical to that described above for each of the multilayer structures for water-resistant adhesiveness evaluation and multilayer structures for heat-resistant adhesiveness evaluation obtained as described above.

Evaluation Criteria of Peel Test

The failure state (specifically, cohesive failure (CF), material failure (MF) of the resin base material, interfacial failure (AF)) and the proportion of the area of the failure state in the released faces (%) were determined for the released faces after the peel test for the initial multilayer structure.

The results for the failure state, such as CF, and the average value (%) of the proportions of the areas of the failure state in the released faces (%) are shown in "Failure state (initial adhesiveness)" rows of Tables 2 to 4. Note that, as an example of the indication of the results, "CF100" indicates that the failure state was cohesive failure and the area of the cohesive failure was 100% with respect to the area of the released faces. Furthermore, "CF90AF10" indicates that the failure state was a mix of cohesive failure and interfacial failure, and the proportion of the area of cohesive failure was 90% and the proportion of the area of interfacial failure was 10% with respect to the area of the released faces.

The evaluation identical to that described above was performed for the released face after the peel test performed for the multilayer structure for water-resistant adhesiveness evaluation. The results are listed in "Failure state (water-resistant adhesiveness)" rows of Tables 2 to 4.

The evaluation identical to that described above was performed for the released faces after the peel test performed for the multilayer structure for heat-resistant adhesiveness evaluation. The results are listed in "Failure state (heat-resistant adhesiveness)" rows of Tables 2 to 4.

From the perspective of adhesiveness, a higher proportion of CF (including MF) is preferred for all "initial adhesiveness", "water-resistant adhesiveness", and "heat-resistant adhesiveness" described above. Furthermore, practically, the proportion of CF is preferably more than 0% for all "initial adhesiveness", "water-resistant adhesiveness", and "heat-resistant adhesiveness" described above.

Strength after Heating at 70° C. for 10 Minutes

For initial multilayer structure using the resin base material 1 (number of samples for each: 10) among the obtained multilayer structures, heating test was performed by heating under a condition at 70° C. in the air for 10 minutes.

By using the multilayer structure after the heating test, tensile test (under an environment at 20° C. and at a tensile test speed of 50 mm/min) was performed in accordance with JIS K 6850:1999, and the shear strength was measured. The results are listed in "Strength after heating at 70° C. for 10 minutes" rows of Tables 2 to 4. A larger value indicates more preferred adhesion durability.

TABLE 2

| | | | Comparative Example | | | | | |
|---|---|---|---|---|---|---|---|---|
| | | | A1 | A2 | A3 | A4 | A5 | A6 |
| Adhesive | | Type | 1-1 | 1-2 | 2-1 | 2-2 | 3 | 4 |
| | | Main agent/curing agent (mass ratio) | 10/1 | — | 10/1 | — | 10/6.7 | 10/1 |
| | | Formula (A) | 36.7 | 39.8 | 30.0 | 33.6 | 1.8 | 85.8 |
| Resin base material | Resin base material 1 Talc-containing PP | Treatment method | Flame treatment 1 | | | | | |
| | | Distance to base material [mm] | 100 | | | | | |
| | | Treatment speed [mm/sec] | 1000 | | | | | |
| | | Number of passes [pass] | 1 | | | | | |
| | | Irradiation time [sec] | — | | | | | |
| | | Base material surface temperature at treatment [° C.] | 45 | | | | | |
| | | $\delta^p$ | 1 | | | | | |
| | | $\delta^d$ | 0.2 | | | | | |
| | | Formula (B) | 1.2 | | | | | |
| | | Failure state (Initial adhesiveness) | AF100 | AF100 | AF100 | AF100 | AF100 | AF100 |
| | | Failure state (Water-resistant adhesiveness) | AF100 | AF100 | AF100 | AF100 | AF100 | AF100 |
| | | Failure state (Heat-resistant adhesiveness) | AF100 | AF100 | AF100 | AF100 | AF100 | AF100 |
| | Resin base material 2 PP-GF | Treatment method | Flame treatment 1 | | | | | |
| | | Distance to base material [mm] | 100 | | | | | |
| | | Treatment speed [mm/sec] | 1000 | | | | | |
| | | Number of passes [pass] | 1 | | | | | |
| | | Irradiation time [sec] | — | | | | | |
| | | Base material surface temperature at treatment [° C.] | 45 | | | | | |
| | | $\delta^p$ | 1 | | | | | |
| | | $\delta^d$ | 0.2 | | | | | |
| | | Formula (B) | 1.2 | | | | | |
| | | Failure state (Initial adhesiveness) | AF100 | AF100 | AF100 | AF100 | AF100 | AF100 |
| | | Failure state (Water-resistant adhesiveness) | AF100 | AF100 | AF100 | AF100 | AF100 | AF100 |
| | | Failure state (Heat-resistant adhesiveness) | AF100 | AF100 | AF100 | AF100 | AF100 | AF100 |
| | Resin base material 3 CFRTP | Treatment method | Flame treatment 1 | | | | | |
| | | Distance to base material [mm] | 100 | | | | | |
| | | Treatment speed [mm/sec] | 1000 | | | | | |
| | | Number of passes [pass] | 1 | | | | | |
| | | Irradiation time [sec] | — | | | | | |

TABLE 2-continued

|  |  |  |  |  |  |  |  |  |
|---|---|---|---|---|---|---|---|---|
|  | Base material surface temperature at treatment [° C.] |  |  |  | 45 |  |  |  |
|  | $\delta^p$ |  |  |  | 0.5 |  |  |  |
|  | $\delta^d$ |  |  |  | 0.2 |  |  |  |
|  | Formula (B) |  |  |  | 0.9 |  |  |  |
|  | Failure state (Initial adhesiveness) | AF100 | AF100 | AF100 | AF100 | AF100 | AF100 |  |
|  | Failure state (Water-resistant adhesiveness) | AF100 | AF100 | AF100 | AF100 | AF100 | AF100 |  |
|  | Failure state (Heat-resistant adhesiveness) | AF100 | AF100 | AF100 | AF100 | AF100 | AF100 |  |
| Strength after heating at 70° C. for 10 minutes [MPa] |  | 0.2 | — | 0.25 | — | 0.5 | 0.1 |  |

|  |  |  | Comparative Example |  |  |  |  |
|---|---|---|---|---|---|---|---|
|  |  |  | A7 | A8 | A9 | A10 | A11 |
| Adhesive |  | Type | 5 | 6 | 7 | 8-1 | 8-2 |
|  |  | Main agent/curing agent (mass ratio) | 10/2.5 | 10/6.7 | 10/10 | 10/1 | — |
|  |  | Formula (A) | 2.1 | 2.5 | 2.1 | 70.0 | 22.9 |
| Resin base material | Resin base material 1 Talc-containing PP | Treatment method |  |  | Flame treatment 1 |  |  |
|  |  | Distance to base material [mm] |  |  | 100 |  |  |
|  |  | Treatment speed [mm/sec] |  |  | 1000 |  |  |
|  |  | Number of passes [pass] |  |  | 1 |  |  |
|  |  | Irradiation time [sec] |  |  | — |  |  |
|  |  | Base material surface temperature at treatment [° C.] |  |  | 45 |  |  |
|  |  | $\delta^p$ |  |  | 1 |  |  |
|  |  | $\delta^d$ |  |  | 0.2 |  |  |
|  |  | Formula (B) |  |  | 1.2 |  |  |
|  |  | Failure state (Initial adhesiveness) | AF100 | AF100 | AF100 | AF100 | AF100 |
|  |  | Failure state (Water-resistant adhesiveness) | AF100 | AF100 | AF100 | AF100 | AFT 00 |
|  |  | Failure state (Heat-resistant adhesiveness) | AF100 | AF100 | AF100 | AF100 | AF100 |
|  | Resin base material 2 PP-GF | Treatment method |  |  | Flame treatment 1 |  |  |
|  |  | Distance to base material [mm] |  |  | 100 |  |  |
|  |  | Treatment speed [mm/sec] |  |  | 1000 |  |  |
|  |  | Number of passes [pass] |  |  | 1 |  |  |
|  |  | Irradiation time [sec] |  |  | — |  |  |
|  |  | Base material surface temperature at treatment [° C.] |  |  | 45 |  |  |
|  |  | $\delta^p$ |  |  | 1 |  |  |
|  |  | $\delta^d$ |  |  | 0.2 |  |  |
|  |  | Formula (B) |  |  | 1.2 |  |  |
|  |  | Failure state (Initial adhesiveness) | AF100 | AF100 | AF100 | AF100 | AF100 |
|  |  | Failure state (Water-resistant adhesiveness) | AF100 | AF100 | AF100 | AF100 | AF100 |
|  |  | Failure state (Heat-resistant adhesiveness) | AF100 | AF100 | AF100 | AF100 | AF100 |
|  | Resin base material 3 CFRTP | Treatment method |  |  | Flame treatment 1 |  |  |
|  |  | Distance to base material [mm] |  |  | 100 |  |  |
|  |  | Treatment speed [mm/sec] |  |  | 1000 |  |  |
|  |  | Number of passes [pass] |  |  | 1 |  |  |
|  |  | Irradiation time [sec] |  |  | — |  |  |
|  |  | Base material surface temperature at treatment [° C.] |  |  | 45 |  |  |
|  |  | $\delta^p$ |  |  | 0.5 |  |  |
|  |  | $\delta^d$ |  |  | 0.2 |  |  |
|  |  | Formula (B) |  |  | 0.9 |  |  |
|  |  | Failure state (Initial adhesiveness) | AF100 | AF100 | AF100 | AF100 | AF100 |
|  |  | Failure state (Water-resistant adhesiveness) | AF100 | AF100 | AF100 | AF100 | AF100 |
|  |  | Failure state (Heat-resistant adhesiveness) | AF100 | AF100 | AF100 | AF100 | AF100 |
| Strength after heating at 70° C. for 10 minutes [MPa] |  |  | 0.3 | 0.3 | 0.5 | 0.2 | — |

|  |  |  | Comparative Example |  |  |  |
|---|---|---|---|---|---|---|
|  |  |  | A12 | A13 | A14 | A15 |
| Adhesive |  | Type | 1-1 | 1-2 | 2-1 | 2-2 |
|  |  | Main agent/curing agent (mass ratio) | 10/1 | — | 10/1 | — |
|  |  | Formula (A) | 36.7 | 39.8 | 30.0 | 33.6 |
| Resin base material | Resin base material 1 Talc- | Treatment method |  | Flame treatment 2 |  |  |
|  |  | Distance to base material [mm] |  | 20 |  |  |
|  |  | Treatment speed [mm/sec] |  | 100 |  |  |

TABLE 2-continued

|  |  |  |  |  |  |  |
|---|---|---|---|---|---|---|
|  | containing PP | Number of passes [pass] | 3 | | | |
|  |  | Irradiation time [sec] | — | | | |
|  |  | Base material surface temperature at treatment [° C.] | 115 | | | |
|  |  | $\delta^p$ | 35 | | | |
|  |  | $\delta^d$ | 12 | | | |
|  |  | Formula (B) | 35.3 | | | |
|  |  | Failure state (Initial adhesiveness) | AF100 | AF100 | AF100 | AF100 |
|  |  | Failure state (Water-resistant adhesiveness) | AF100 | AF100 | AF100 | AF100 |
|  |  | Failure state (Heat-resistant adhesiveness) | AF100 | AF100 | AF100 | AF100 |
|  | Resin base material 2 PP-GF | Treatment method | Flame treatment 2 | | | |
|  |  | Distance to base material [mm] | 20 | | | |
|  |  | Treatment speed [mm/sec] | 100 | | | |
|  |  | Number of passes [pass] | 3 | | | |
|  |  | Irradiation time [sec] | — | | | |
|  |  | Base material surface temperature at treatment [° C.] | 115 | | | |
|  |  | $\delta^p$ | 32 | | | |
|  |  | $\delta^d$ | 12 | | | |
|  |  | Formula (B) | 32.4 | | | |
|  |  | Failure state (Initial adhesiveness) | AF100 | AF100 | AF100 | AF100 |
|  |  | Failure state (Water-resistant adhesiveness) | AF100 | AF100 | AF100 | AF100 |
|  |  | Failure state (Heat-resistant adhesiveness) | AF100 | AF100 | AF100 | AF100 |
|  | Resin base material 3 CFRTP | Treatment method | Flame treatment 2 | | | |
|  |  | Distance to base material [mm] | 20 | | | |
|  |  | Treatment speed [mm/sec] | 100 | | | |
|  |  | Number of passes [pass] | 3 | | | |
|  |  | Irradiation time [sec] | — | | | |
|  |  | Base material surface temperature at treatment [° C.] | 125 | | | |
|  |  | $\delta^p$ | 35 | | | |
|  |  | $\delta^d$ | 9 | | | |
|  |  | Formula (B) | 35.3 | | | |
|  |  | Failure state (Initial adhesiveness) | AF100 | AF100 | AF100 | AF100 |
|  |  | Failure state (Water-resistant adhesiveness) | AF100 | AF100 | AF100 | AF100 |
|  |  | Failure state (Heat-resistant adhesiveness) | AF100 | AF100 | AF100 | AF100 |
|  | Strength after heating at 70° C. for 10 minutes [MPa] | | 0.2 | — | 0.25 | — |

|  |  |  | A16 | A17 | A18 | A19 |
|---|---|---|---|---|---|---|
| | Adhesive | Type | 3 | 4 | 3 | 4 |
| | | Main agent/curing agent (mass ratio) | 10/6.7 | 10/1 | 10/6.7 | 10/1 |
| | | Formula (A) | 1.8 | 85.8 | 1.8 | 85.8 |
| Resin base material | Resin base material 1 Talc-containing PP | Treatment method | Flame treatment 3 | | Flame treatment 4 | |
| | | Distance to base material [mm] | 60 | | 80 | |
| | | Treatment speed [mm/sec] | 500 | | 800 | |
| | | Number of passes [pass] | 1 | | 1 | |
| | | Irradiation time [sec] | — | | — | |
| | | Base material surface temperature at treatment [° C.] | 95 | | 65 | |
| | | $\delta^p$ | 18 | | 4 | |
| | | $\delta^d$ | 4 | | 1 | |
| | | Formula (B) | 18.2 | | 4.3 | |
| | | Failure state (Initial adhesiveness) | AF100 | CF100 | AF100 | CF100 |
| | | Failure state (Water-resistant adhesiveness) | AF100 | AF100 | AF100 | AF100 |
| | | Failure state (Heat-resistant adhesiveness) | AF100 | AF100 | AF100 | AF100 |
| | Resin base material 2 PP-GF | Treatment method | Flame treatment 3 | | Flame treatment 4 | |
| | | Distance to base material [mm] | 60 | | 80 | |
| | | Treatment speed [mm/sec] | 500 | | 800 | |
| | | Number of passes [pass] | 1 | | 1 | |
| | | Irradiation time [sec] | — | | — | |
| | | Base material surface temperature at treatment [° C.] | 95 | | 65 | |
| | | $\delta^p$ | 18 | | 3 | |
| | | $\delta^d$ | 4 | | 1 | |
| | | Formula (B) | 18.2 | | 3.3 | |
| | | Failure state | AF100 | CF100 | AF100 | CF20 |

TABLE 2-continued

| | | | | | | |
|---|---|---|---|---|---|---|
| | | (Initial adhesiveness) | | | | AF80 |
| | | Failure state (Water-resistant adhesiveness) | AF100 | AF100 | AF100 | AF100 |
| | | Failure state (Heat-resistant adhesiveness) | AF100 | AF100 | AF100 | AF100 |
| | Resin base material 3 CFRTP | Treatment method | Flame treatment 3 | | Flame treatment 4 | |
| | | Distance to base material [mm] | 60 | | 80 | |
| | | Treatment speed [mm/sec] | 500 | | 800 | |
| | | Number of passes [pass] | 1 | | 1 | |
| | | Irradiation time [sec] | — | | — | |
| | | Base material surface temperature at treatment [° C.] | 95 | | 65 | |
| | | $\delta^p$ | 18 | | 3 | |
| | | $\delta^d$ | 4 | | 1 | |
| | | Formula (B) | 18.2 | | 3.3 | |
| | | Failure state (Initial adhesiveness) | AF100 | CF100 | AF100 | CF70 AF30 |
| | | Failure state (Water-resistant adhesiveness) | AF100 | AF100 | AF100 | AF100 |
| | | Failure state (Heat-resistant adhesiveness) | AF100 | AF100 | AF100 | AF100 |
| Strength after heating at 70° C. for 10 minutes [MPa] | | | 0.5 | 0.1 | 0.5 | 0.1 |

TABLE 3

| | | | Examples | | | | |
|---|---|---|---|---|---|---|---|
| | | | A1 | A2 | A3 | A4 | A5 |
| Adhesive | | Type | 1-1 | 1-2 | 2-1 | 2-2 | 5 |
| | | Main agent/curing agent (mass ratio) | 10/1 | — | 10/1 | — | 10/2.5 |
| | | Formula (A) | 36.7 | 39.8 | 30.0 | 33.6 | 2.1 |
| Resin base material | Resin base material 1 Talc-containing PP | Treatment method | Flame treatment 3 | | | | |
| | | Distance to base material [mm] | 60 | | | | |
| | | Treatment speed [mm/sec] | 500 | | | | |
| | | Number of passes [pass] | 1 | | | | |
| | | Irradiation time [sec] | — | | | | |
| | | Base material surface temperature at treatment [° C.] | 95 | | | | |
| | | $\delta^p$ | 18 | | | | |
| | | $\delta^d$ | 4 | | | | |
| | | Formula (B) | 18.2 | | | | |
| | | Failure state (Initial adhesiveness) | CF100 | CF100 | CF100 | CF100 | CF100 |
| | | Failure state (Water-resistant adhesiveness) | CF60 AF40 | CF70 AF30 | CF100 | CF100 | CF100 |
| | | Failure state (Heat-resistant adhesiveness) | CF10 AF90 | CF5 AF95 | CF90 AF10 | CF95 AF5 | CF20 AF80 |
| | Resin base material 2 PP-GF | Treatment method | Flame treatment 3 | | | | |
| | | Distance to base material [mm] | 60 | | | | |
| | | Treatment speed [mm/sec] | 500 | | | | |
| | | Number of passes [pass] | 1 | | | | |
| | | Irradiation time [sec] | — | | | | |
| | | Base material surface temperature at treatment [° C.] | 95 | | | | |
| | | $\delta^p$ | 18 | | | | |
| | | $\delta^d$ | 4 | | | | |
| | | Formula (B) | 18.2 | | | | |
| | | Failure state (Initial adhesiveness) | CF100 | CF100 | CF100 | CF100 | CF100 |
| | | Failure state (Water-resistant adhesiveness) | CF70 AF30 | CF60 AF40 | CF100 | CF100 | CF70 AF30 |
| | | Failure state (Heat-resistant adhesiveness) | CF5 AF95 | CF15 AF85 | CF75 AF25 | CF80 AF20 | CF5 AF95 |
| | Resin base material 3 CFRTP | Treatment method | Flame treatment 3 | | | | |
| | | Distance to base material [mm] | 60 | | | | |
| | | Treatment speed [mm/sec] | 500 | | | | |
| | | Number of passes [pass] | 1 | | | | |
| | | Irradiation time [sec] | — | | | | |
| | | Base material surface temperature at treatment [° C.] | 95 | | | | |
| | | $\delta^p$ | 18 | | | | |
| | | $\delta^d$ | 4 | | | | |
| | | Formula (B) | 18.2 | | | | |
| | | Failure state (Initial adhesiveness) | CF100 | CF100 | CF100 | CF100 | CF100 |

TABLE 3-continued

|  |  |  |  |  |  |  |
|---|---|---|---|---|---|---|
|  | Failure state (Water-resistant adhesiveness) | CF75 AF25 | CF70 AF30 | CF100 | CF100 | CF80 AF20 |
|  | Failure state (Heat-resistant adhesiveness) | CF10 AF90 | CF5 AF95 | CF70 AF30 | CF75 AF25 | CF10 AF90 |
| Strength after heating at 70° C. for 10 minutes [MPa] |  | 0.2 | — | 0.25 | — | 0.3 |

|  |  |  | Examples | | | |
|---|---|---|---|---|---|---|
|  |  |  | A6 | A7 | A8 | A9 |
| Adhesive |  | Type | 6 | 7 | 8-1 | 8-2 |
|  |  | Main agent/curing agent (mass ratio) | 10/6.7 | 10/10 | 10/1 | — |
|  |  | Formula (A) | 2.5 | 2.1 | 70.0 | 22.9 |
| Resin base material | Resin base material 1 Talc-containing PP | Treatment method | Flame treatment 3 | | | |
|  |  | Distance to base material [mm] | 60 | | | |
|  |  | Treatment speed [mm/sec] | 500 | | | |
|  |  | Number of passes [pass] | 1 | | | |
|  |  | Irradiation time [sec] | — | | | |
|  |  | Base material surface temperature at treatment [° C.] | 95 | | | |
|  |  | $\delta^p$ | 18 | | | |
|  |  | $\delta^d$ | 4 | | | |
|  |  | Formula (B) | 18.2 | | | |
|  |  | Failure state (Initial adhesiveness) | CF60 MF40 | CF80 MF20 | CF100 | CF100 |
|  |  | Failure state (Water-resistant adhesiveness) | CF40 MF60 | CF70 AF30 | CF100 | CF100 |
|  |  | Failure state (Heat-resistant adhesiveness) | CF50 AF50 | CF40 AF60 | CF95 AF5 | CF90 AF10 |
|  | Resin base material 2 PP-GF | Treatment method | Flame treatment 3 | | | |
|  |  | Distance to base material [mm] | 60 | | | |
|  |  | Treatment speed [mm/sec] | 500 | | | |
|  |  | Number of passes [pass] | 1 | | | |
|  |  | Irradiation time [sec] | — | | | |
|  |  | Base material surface temperature at treatment [° C.] | 95 | | | |
|  |  | $\delta^p$ | 18 | | | |
|  |  | $\delta^d$ | 4 | | | |
|  |  | Formula (B) | 18.2 | | | |
|  |  | Failure state (Initial adhesiveness) | CF100 | CF80 AF20 | CF100 | CF100 |
|  |  | Failure state (Water-resistant adhesiveness) | CF60 AF40 | CF60 AF40 | CF100 | CF100 |
|  |  | Failure state (Heat-resistant adhesiveness) | CF5 AF95 | CF5 AF95 | CF80 AF20 | CF70 AF30 |
|  | Resin base material 3 CFRTP | Treatment method | Flame treatment 3 | | | |
|  |  | Distance to base material [mm] | 60 | | | |
|  |  | Treatment speed [mm/sec] | 500 | | | |
|  |  | Number of passes [pass] | 1 | | | |
|  |  | Irradiation time [sec] | — | | | |
|  |  | Base material surface temperature at treatment [° C.] | 95 | | | |
|  |  | $\delta^p$ | 18 | | | |
|  |  | $\delta^d$ | 4 | | | |
|  |  | Formula (B) | 18.2 | | | |
|  |  | Failure state (Initial adhesiveness) | CF100 | CF90 AF10 | CF100 | CF100 |
|  |  | Failure state (Water-resistant adhesiveness) | CF70 AF30 | CF70 AF30 | CF100 | CF100 |
|  |  | Failure state (Heat-resistant adhesiveness) | CF20 AF80 | CF5 AF95 | CF75 AF25 | CF75 AF25 |
| Strength after heating at 70° C. for 10 minutes [MPa] |  | 0.3 | 0.5 | 0.2 | — |

|  |  |  | Examples | | | |
|---|---|---|---|---|---|---|
|  |  |  | A10 | A11 | A12 | A13 |
| Adhesive |  | Type | 1-1 | 1-2 | 2-1 | 2-2 |
|  |  | Main agent/curing agent (mass ratio) | 10/1 | — | 10/1 | — |
|  |  | Formula (A) | 36.7 | 39.8 | 30.0 | 33.6 |
| Resin base material | Resin base material 1 Talc-containing PP | Treatment method | Flame treatment 4 | | | |
|  |  | Distance to base material [mm] | 80 | | | |
|  |  | Treatment speed [mm/sec] | 800 | | | |
|  |  | Number of passes [pass] | 1 | | | |
|  |  | Irradiation time [sec] | — | | | |
|  |  | Base material surface temperature at treatment [° C.] | 65 | | | |
|  |  | $\delta^p$ | 4 | | | |
|  |  | $\delta^d$ | 1 | | | |

TABLE 3-continued

|  |  |  |  |  |  |  |
|---|---|---|---|---|---|---|
|  |  | Formula (B) | | | 4.3 | |
|  |  | Failure state (Initial adhesiveness) | CF100 | CF100 | CF100 | CF100 |
|  |  | Failure state (Water-resistant adhesiveness) | CF90 AF10 | CF95 AF5 | CF100 | CF100 |
|  |  | Failure state (Heat-resistant adhesiveness) | CF5 AF95 | CF10 AF90 | CF100 | CF100 |
|  | Resin base material 2 PP-GF | Treatment method | | Flame treatment 4 | | |
|  |  | Distance to base material [mm] | | 80 | | |
|  |  | Treatment speed [mm/sec] | | 800 | | |
|  |  | Number of passes [pass] | | 1 | | |
|  |  | Irradiation time [sec] | | — | | |
|  |  | Base material surface temperature at treatment [° C.] | | 65 | | |
|  |  | $\delta^p$ | | 3 | | |
|  |  | $\delta^d$ | | 1 | | |
|  |  | Formula (B) | | 3.3 | | |
|  |  | Failure state (Initial adhesiveness) | CF85 AF15 | CF100 | CF100 | CF100 |
|  |  | Failure state (Water-resistant adhesiveness) | CF90 AF10 | CF95 AF5 | CF100 | CF100 |
|  |  | Failure state (Heat-resistant adhesiveness) | CF20 AF80 | CF30 AF70 | CF100 | CF100 |
|  | Resin base material 3 CFRTP | Treatment method | | Flame treatment 4 | | |
|  |  | Distance to base material [mm] | | 80 | | |
|  |  | Treatment speed [mm/sec] | | 800 | | |
|  |  | Number of passes [pass] | | 1 | | |
|  |  | Irradiation time [sec] | | — | | |
|  |  | Base material surface temperature at treatment [° C.] | | 65 | | |
|  |  | $\delta^p$ | | 3 | | |
|  |  | $\delta^d$ | | 1 | | |
|  |  | Formula (B) | | 3.3 | | |
|  |  | Failure state (Initial adhesiveness) | CF90 AF10 | CF100 | CF100 | CF100 |
|  |  | Failure state (Water-resistant adhesiveness) | CF70 AF30 | CF80 AF20 | CF100 | CF100 |
|  |  | Failure state (Heat-resistant adhesiveness) | CF20 AF80 | CF10 AF90 | CF100 | CF100 |
| Strength after heating at 70° C. for 10 minutes [MPa] | | | 0.2 | — | 0.25 | — |

|  |  |  | Examples | | | | |
|---|---|---|---|---|---|---|---|
|  |  |  | A14 | A15 | A16 | A17 | A18 |
|  | Adhesive | Type | 1-1 | 1-2 | 2-1 | 2-2 | 5 |
|  |  | Main agent/curing agent (mass ratio) | 10/1 | — | 10/1 | — | 10/2.5 |
|  |  | Formula (A) | 36.7 | 39.8 | 30.0 | 33.6 | 2.1 |
| Resin base material | Resin base material 1 Talc-containing PP | Treatment method | | Flame treatment 5 | | | |
|  |  | Distance to base material [mm] | | 100 | | | |
|  |  | Treatment speed [mm/sec] | | 600 | | | |
|  |  | Number of passes [pass] | | 1 | | | |
|  |  | Irradiation time [sec] | | — | | | |
|  |  | Base material surface temperature at treatment [° C.] | | 75 | | | |
|  |  | $\delta^p$ | | 8 | | | |
|  |  | $\delta^d$ | | 2 | | | |
|  |  | Formula (B) | | 8.3 | | | |
|  |  | Failure state (Initial adhesiveness) | CF90 AF10 | CF100 | CF100 | CF100 | CF80 AF20 |
|  |  | Failure state (Water-resistant adhesiveness) | CF50 AF50 | CF60 AF40 | CF100 | CF100 | CF70 AF30 |
|  |  | Failure state (Heat-resistant adhesiveness) | CF10 AF90 | CF15 AF85 | CF100 | CF100 | CF10 AF90 |
|  | Resin base material 2 PP-GF | Treatment method | | Flame treatment 5 | | | |
|  |  | Distance to base material [mm] | | 100 | | | |
|  |  | Treatment speed [mm/sec] | | 600 | | | |
|  |  | Number of passes [pass] | | 1 | | | |
|  |  | Irradiation time [sec] | | — | | | |
|  |  | Base material surface temperature at treatment [° C.] | | 75 | | | |
|  |  | $\delta^p$ | | 7 | | | |
|  |  | $\delta^d$ | | 2 | | | |
|  |  | Formula (B) | | 7.3 | | | |
|  |  | Failure state (Initial adhesiveness) | CF95 AF5 | CF100 | CF100 | CF100 | CF100 |
|  |  | Failure state (Water-resistant adhesiveness) | CF70 AF30 | CF65 AF35 | CF100 | CF100 | CF100 |

TABLE 3-continued

|  |  |  |  |  |  |  |  |
|---|---|---|---|---|---|---|---|
|  |  | Failure state<br>(Heat-resistant adhesiveness) | CF5<br>AF95 | CF5<br>AF95 | CF100 | CF100 | CF20<br>AF80 |
|  | Resin base<br>material 3<br>CFRTP | Treatment method | | Flame treatment 6 | | | |
|  |  | Distance to base material [mm] | | 60 | | | |
|  |  | Treatment speed [mm/sec] | | 800 | | | |
|  |  | Number of passes [pass] | | 3 | | | |
|  |  | Irradiation time [sec] | | — | | | |
|  |  | Base material surface temperature at treatment [° C.] | | 120 | | | |
|  |  | $\delta^p$ | | 27 | | | |
|  |  | $\delta^d$ | | 7 | | | |
|  |  | Formula (B) | | 27.3 | | | |
|  |  | Failure state<br>(Initial adhesiveness) | CF95<br>AF5 | CF100 | CF100 | CF100 | CF100 |
|  |  | Failure state<br>(Water-resistant adhesiveness) | CF80<br>AF20 | CF70<br>AF30 | CF100 | CF100 | CF100 |
|  |  | Failure state<br>(Heat-resistant adhesiveness) | CF20<br>AF80 | CF30<br>AF70 | CF100 | CF100 | CF10<br>AF90 |
| Strength after heating at 70° C. for 10 minutes [MPa] | | | 0.2 | — | 0.25 | — | 0.3 |

|  |  |  | Examples | | | |
|---|---|---|---|---|---|---|
|  |  |  | A19 | A20 | A21 | A22 |
| Adhesive | | Type | 6 | 7 | 8-1 | 8-2 |
|  | | Main agent/curing agent (mass ratio) | 10/6.7 | 10/10 | 10/1 | — |
|  | | Formula (A) | 2.5 | 2.1 | 70.0 | 22.9 |
| Resin base<br>material | Resin base<br>material 1<br>Talc-<br>containing<br>PP | Treatment method | Flame treatment 5 | | | |
|  |  | Distance to base material [mm] | 100 | | | |
|  |  | Treatment speed [mm/sec] | 600 | | | |
|  |  | Number of passes [pass] | 1 | | | |
|  |  | Irradiation time [sec] | — | | | |
|  |  | Base material surface temperature at treatment [° C.] | 75 | | | |
|  |  | $\delta^p$ | 8 | | | |
|  |  | $\delta^d$ | 2 | | | |
|  |  | Formula (B) | 8.3 | | | |
|  |  | Failure state<br>(Initial adhesiveness) | CF60<br>AF40 | CF50<br>MF50 | CF100 | CF100 |
|  |  | Failure state<br>(Water-resistant adhesiveness) | CF60<br>AF40 | CF70<br>AF30 | CF100 | CF100 |
|  |  | Failure state<br>(Heat-resistant adhesiveness) | CF5<br>AF95 | CF5<br>AF95 | CF90<br>AF10 | CF100 |
|  | Resin base<br>material 2<br>PP-GF | Treatment method | Flame treatment 5 | | | |
|  |  | Distance to base material [mm] | 100 | | | |
|  |  | Treatment speed [mm/sec] | 600 | | | |
|  |  | Number of passes [pass] | 1 | | | |
|  |  | Irradiation time [sec] | — | | | |
|  |  | Base material surface temperature at treatment [° C.] | 75 | | | |
|  |  | $\delta^p$ | 7 | | | |
|  |  | $\delta^d$ | 2 | | | |
|  |  | Formula (B) | 7.3 | | | |
|  |  | Failure state<br>(Initial adhesiveness) | CF75<br>AF25 | CF80<br>AF20 | CF100 | CF100 |
|  |  | Failure state<br>(Water-resistant adhesiveness) | CF60<br>AF40 | CF60<br>AF40 | CF100 | CF100 |
|  |  | Failure state<br>(Heat-resistant adhesiveness) | CF10<br>AF90 | CF5<br>AF95 | CF75<br>AF25 | CF100 |
|  | Resin base<br>material 3<br>CFRTP | Treatment method | Flame treatment 6 | | | |
|  |  | Distance to base material [mm] | 60 | | | |
|  |  | Treatment speed [mm/sec] | 800 | | | |
|  |  | Number of passes [pass] | 3 | | | |
|  |  | Irradiation time [sec] | — | | | |
|  |  | Base material surface temperature at treatment [° C.] | 120 | | | |
|  |  | $\delta^p$ | 27 | | | |
|  |  | $\delta^d$ | 7 | | | |
|  |  | Formula (B) | 27.3 | | | |
|  |  | Failure state<br>(Initial adhesiveness) | CF100 | CF80<br>AF20 | CF100 | CF100 |
|  |  | Failure state<br>(Water-resistant adhesiveness) | CF70<br>AF30 | CF60<br>AF40 | CF100 | CF100 |
|  |  | Failure state<br>(Heat-resistant adhesiveness) | CF15<br>AF85 | CF10<br>AF90 | CF80<br>AF20 | CF100 |
| Strength after heating at 70° C. for 10 minutes [MPa] | | | 0.3 | 0.5 | 0.2 | — |

TABLE 4

| | | | Comparative Example | | Example | | | |
|---|---|---|---|---|---|---|---|---|
| | | | B1 | B2 | B1 | B2 | B3 | B4 |
| Adhesive | | Type | 3 | 4 | 1-1 | 1-2 | 2-1 | 2-2 |
| | | Main agent/curing agent (mass ratio) | 10/6.7 | 10/1 | 10/1 | — | 10/1 | — |
| | | Formula (A) | 1.8 | 85.8 | 36.7 | 39.8 | 30.0 | 33.6 |
| Resin base material | Resin base material 1 Talc-containing PP | Treatment method | Plasma treatment 1 | | Plasma treatment 1 | | | |
| | | Distance to base material [mm] | 15 | | 15 | | | |
| | | Treatment speed [mm/sec] | 400 | | 400 | | | |
| | | Number of passes [pass] | 1 | | 1 | | | |
| | | Irradiation time [sec] | — | | — | | | |
| | | Base material surface temperature at treatment [° C.] | 100 | | 100 | | | |
| | | $\delta^p$ | 12 | | 12 | | | |
| | | $\delta^d$ | 8 | | 8 | | | |
| | | Formula (B) | 12.7 | | 12.7 | | | |
| | | Failure state (Initial adhesiveness) | CF90 AF10 | CF100 | CF100 | CF100 | CF100 | CF100 |
| | | Failure state (Water-resistant adhesiveness) | AF100 | AF100 | CF70 AF30 | CF75 AF25 | CF100 | CF100 |
| | | Failure state (Heat-resistant adhesiveness) | AF100 | AF100 | CF20 AF80 | CF10 AF90 | CF100 | CF100 |
| | Resin base material 2 PP-GF | Treatment method | Plasma treatment 1 | | Plasma treatment 1 | | | |
| | | Distance to base material [mm] | 15 | | 15 | | | |
| | | Treatment speed [mm/sec] | 400 | | 400 | | | |
| | | Number of passes [pass] | 1 | | 1 | | | |
| | | Irradiation time [sec] | — | | — | | | |
| | | Base material surface temperature at treatment [° C.] | 100 | | 100 | | | |
| | | $\delta^p$ | 11 | | 11 | | | |
| | | $\delta^d$ | 5 | | 5 | | | |
| | | Formula (B) | 11.5 | | 11.5 | | | |
| | | Failure state (Initial adhesiveness) | CF80 AF20 | CF100 | CF100 | CF100 | CF100 | CF100 |
| | | Failure state (Water-resistant adhesiveness) | AF100 | AF100 | CF60 AF40 | CF70 AF30 | CF100 | CF100 |
| | | Failure state (Heat-resistant adhesiveness) | AF100 | AF100 | CF10 AF90 | CF10 AF90 | CF100 | CF100 |
| | Resin base material 3 CFRTP | Treatment method | Plasma treatment 1 | | Plasma treatment 1 | | | |
| | | Distance to base material [mm] | 15 | | 15 | | | |
| | | Treatment speed [mm/sec] | 400 | | 400 | | | |
| | | Number of passes [pass] | 1 | | 1 | | | |
| | | Irradiation time [sec] | — | | — | | | |
| | | Base material surface temperature at treatment [° C.] | 100 | | 100 | | | |
| | | $\delta^p$ | 10 | | 10 | | | |
| | | $\delta^d$ | 4 | | 4 | | | |
| | | Formula (B) | 10.4 | | 10.4 | | | |
| | | Failure state (Initial adhesiveness) | AF100 | CF100 | CF100 | CF100 | CF100 | CF100 |
| | | Failure state (Water-resistant adhesiveness) | AF100 | AF100 | CF60 AF40 | CF65 AF35 | CF100 | CF100 |
| | | Failure state (Heat-resistant adhesiveness) | AF100 | AF100 | CF5 AF95 | CF10 AF90 | CF100 | CF100 |
| Strength after heating at 70° C. for 10 minutes [MPa] | | | 0.5 | 0.1 | 0.2 | — | 0.25 | — |

| | | | Comparative Example | | | | | |
|---|---|---|---|---|---|---|---|---|
| | | | C1 | C2 | C3 | C4 | C5 | C6 |
| Adhesive | | Type | 1-1 | 1-2 | 2-1 | 2-2 | 3 | 4 |
| | | Main agent/curing agent (mass ratio) | 10/1 | — | 10/1 | — | 10/6.7 | 10/1 |
| | | Formula (A) | 36.7 | 39.8 | 30.0 | 33.6 | 1.8 | 85.8 |
| Resin base material | Resin base material 1 Talc-containing PP | Treatment method | UV treatment 1 | | | | UV treatment 2 | |
| | | Distance to base material [mm] | 10 | | | | 20 | |
| | | Treatment speed [mm/sec] | — | | | | — | |
| | | Number of passes [pass] | — | | | | — | |
| | | Irradiation time [sec] | 15 | | | | 180 | |
| | | Base material surface temperature at treatment [° C.] | 40 | | | | 65 | |
| | | $\delta^p$ | 1.1 | | | | 3 | |
| | | $\delta^d$ | 0.1 | | | | 3 | |
| | | Formula (B) | 1.2 | | | | 4.0 | |
| | | Failure state (Initial adhesiveness) | CF90 AF10 | CF95 AF5 | CF95 AF5 | CF95 AF5 | CF80 AF20 | CF100 |
| | | Failure state (Water-resistant adhesiveness) | AF100 | AF100 | AF100 | AF100 | AF100 | AF100 |
| | | Failure state (Heat-resistant adhesiveness) | AF100 | AF100 | AF100 | AF100 | AF100 | AF100 |

TABLE 4-continued

| | | | | | | | | | |
|---|---|---|---|---|---|---|---|---|---|
| Resin base material 2 PP-GF | Treatment method | | UV treatment 1 | | | | UV treatment 3 | | |
| | Distance to base material [mm] | | 10 | | | | 20 | | |
| | Treatment speed [mm/sec] | | — | | | | — | | |
| | Number of passes [pass] | | — | | | | — | | |
| | Irradiation time [sec] | | 15 | | | | 60 | | |
| | Base material surface temperature at treatment [° C.] | | 45 | | | | 60 | | |
| | $\delta^p$ | | 1.0 | | | | 3 | | |
| | $\delta^d$ | | 0.1 | | | | 1.0 | | |
| | Formula (B) | | 1.1 | | | | 3.3 | | |
| | Failure state (Initial adhesiveness) | CF90 AF10 | CF90 AF10 | CF90 AF10 | CF95 AF5 | CF90 AF10 | CF100 | | |
| | Failure state (Water-resistant adhesiveness) | AF100 | AF100 | AF100 | AF100 | AF100 | AF100 | | |
| | Failure state (Heat-resistant adhesiveness) | AF100 | AF100 | AF100 | AF100 | AF100 | AF100 | | |
| Resin base material 3 CFRTP | Treatment method | | UV treatment 1 | | | | UV treatment 4 | | |
| | Distance to base material [mm] | | 10 | | | | 20 | | |
| | Treatment speed [mm/sec] | | — | | | | — | | |
| | Number of passes [pass] | | — | | | | — | | |
| | Irradiation time [sec] | | 15 | | | | 30 | | |
| | Base material surface temperature at treatment [° C.] | | 40 | | | | 60 | | |
| | $\delta^p$ | | 0.7 | | | | 3.00 | | |
| | $\delta^d$ | | 0.1 | | | | 1 | | |
| | Formula (B) | | 0.8 | | | | 3.3 | | |
| | Failure state (Initial adhesiveness) | CF95 AF5 | CF90 AF10 | CF95 AF5 | CF95 AF5 | CF100 | CF100 | | |
| | Failure state (Water-resistant adhesiveness) | AF100 | AF100 | AF100 | AF100 | AF100 | AF100 | | |
| | Failure state (Heat-resistant adhesiveness) | AF100 | AF100 | AF100 | AF100 | AF100 | AF100 | | |
| Strength after heating at 70° C. for 10 minutes [MPa] | | 0.2 | — | 0.25 | — | 0.5 | 0.1 | | |

| | | | Example | | | | |
|---|---|---|---|---|---|---|---|
| | | | C1 | C2 | C3 | C4 | C5 |
| Adhesive | | Type | 1-1 | 1-2 | 2-1 | 2-2 | 5 |
| | | Main agent/curing agent (mass ratio) | 10/1 | — | 10/1 | — | 10/2.5 |
| | | Formula (A) | 36.7 | 39.8 | 30.0 | 33.6 | 2.1 |
| Resin base material | Resin base material 1 Talc-containing PP | Treatment method | | | UV treatment 2 | | |
| | | Distance to base material [mm] | | | 20 | | |
| | | Treatment speed [mm/sec] | | | — | | |
| | | Number of passes [pass] | | | — | | |
| | | Irradiation time [sec] | | | 180 | | |
| | | Base material surface temperature at treatment [° C.] | | | 65 | | |
| | | $\delta^p$ | | | 3 | | |
| | | $\delta^d$ | | | 3 | | |
| | | Formula (B) | | | 4.0 | | |
| | | Failure state (Initial adhesiveness) | CF100 | CF100 | CF100 | CF100 | CF100 |
| | | Failure state (Water-resistant adhesiveness) | CF80 AF20 | CF70 AF30 | CF100 | CF100 | CF60 AF40 |
| | | Failure state (Heat-resistant adhesiveness) | CF10 AF90 | CF5 AF95 | CF100 | CF100 | CF5 AF95 |
| | Resin base material 2 PP-GF | Treatment method | | | UV treatment 3 | | |
| | | Distance to base material [mm] | | | 20 | | |
| | | Treatment speed [mm/sec] | | | — | | |
| | | Number of passes [pass] | | | — | | |
| | | Irradiation time [sec] | | | 60 | | |
| | | Base material surface temperature at treatment [° C.] | | | 60 | | |
| | | $\delta^p$ | | | 3 | | |
| | | $\delta^d$ | | | 1 | | |
| | | Formula (B) | | | 3.3 | | |
| | | Failure state (Initial adhesiveness) | CF100 | CF100 | CF100 | CF100 | CF100 |
| | | Failure state (Water-resistant adhesiveness) | CF65 AF35 | CF75 AF25 | CF100 | CF100 | CF75 AF25 |
| | | Failure state (Heat-resistant adhesiveness) | CF5 AF95 | CF10 AF90 | CF100 | CF100 | CF10 AF90 |
| | Resin base material 3 CFRTP | Treatment method | | | UV treatment 4 | | |
| | | Distance to base material [mm] | | | 20 | | |
| | | Treatment speed [mm/sec] | | | — | | |
| | | Number of passes [pass] | | | — | | |
| | | Irradiation time [sec] | | | 30 | | |
| | | Base material surface temperature at treatment [° C.] | | | 60 | | |

TABLE 4-continued

|  |  |  |  |  | 3.00 |  |  |
|---|---|---|---|---|---|---|---|
|  | $\delta^p$ |  |  |  | 1.0 |  |  |
|  | $\delta^d$ |  |  |  | 3.3 |  |  |
|  | Formula (B) |  |  |  |  |  |  |
|  | Failure state (Initial adhesiveness) | CF100 | CF100 | CF100 | CF100 | CF100 |  |
|  | Failure state (Water-resistant adhesiveness) | CF70 AF30 | CF75 AF25 | CF100 | CF100 | CF60 AF40 |  |
|  | Failure state (Heat-resistant adhesiveness) | CF10 AF90 | CF10 AF90 | CF100 | CF100 | CF5 AF95 |  |
|  | Strength after heating at 70° C. for 10 minutes [MPa] | 0.2 | — | 0.25 | — | 0.3 |  |

|  |  |  | Example |  |  |  |
|---|---|---|---|---|---|---|
|  |  |  | C6 | C7 | C8 | C9 |
|  | Adhesive | Type | 6 | 7 | 8-1 | 8-2 |
|  |  | Main agent/curing agent (mass ratio) | 10/6.7 | 10/10 | 10/1 | — |
|  |  | Formula (A) | 2.5 | 2.1 | 70.0 | 22.9 |
| Resin base material | Resin base material 1 Talc-containing PP | Treatment method | UV treatment 2 | | | |
|  |  | Distance to base material [mm] | 20 | | | |
|  |  | Treatment speed [mm/sec] | — | | | |
|  |  | Number of passes [pass] | — | | | |
|  |  | Irradiation time [sec] | 180 | | | |
|  |  | Base material surface temperature at treatment [° C.] | 65 | | | |
|  |  | $\delta^p$ | 3 | | | |
|  |  | $\delta^d$ | 3 | | | |
|  |  | Formula (B) | 4.0 | | | |
|  |  | Failure state (Initial adhesiveness) | CF100 | CF100 | CF100 | CF100 |
|  |  | Failure state (Water-resistant adhesiveness) | CF60 AF40 | CF70 AF30 | CF100 | CF100 |
|  |  | Failure state (Heat-resistant adhesiveness) | CF5 AF95 | CF5 AF95 | CF90 AF10 | CF100 |
|  | Resin base material 2 PP-GF | Treatment method | UV treatment 3 | | | |
|  |  | Distance to base material [mm] | 20 | | | |
|  |  | Treatment speed [mm/sec] | — | | | |
|  |  | Number of passes [pass] | — | | | |
|  |  | Irradiation time [sec] | 60 | | | |
|  |  | Base material surface temperature at treatment [° C.] | 60 | | | |
|  |  | $\delta^p$ | 3 | | | |
|  |  | $\delta^d$ | 1 | | | |
|  |  | Formula (B) | 3.3 | | | |
|  |  | Failure state (Initial adhesiveness) | CF100 | CF100 | CF100 | CF100 |
|  |  | Failure state (Water-resistant adhesiveness) | CF60 AF40 | CF75 AF25 | CF100 | CF100 |
|  |  | Failure state (Heat-resistant adhesiveness) | CF5 AF95 | CF10 AF90 | CF80 AF20 | CF100 |
|  | Resin base material 3 CFRTP | Treatment method | UV treatment 4 | | | |
|  |  | Distance to base material [mm] | 20 | | | |
|  |  | Treatment speed [mm/sec] | — | | | |
|  |  | Number of passes [pass] | — | | | |
|  |  | Irradiation time [sec] | 30 | | | |
|  |  | Base material surface temperature at treatment [° C.] | 60 | | | |
|  |  | $\delta^p$ | 3.00 | | | |
|  |  | $\delta^d$ | 1.0 | | | |
|  |  | Formula (B) | 3.3 | | | |
|  |  | Failure state (Initial adhesiveness) | CF100 | CF100 | CF100 | CF100 |
|  |  | Failure state (Water-resistant adhesiveness) | CF60 AF40 | CF70 AF30 | CF100 | CF100 |
|  |  | Failure state (Heat-resistant adhesiveness) | CF10 AF90 | CF10 AF90 | CF75 AF25 | CF100 |
|  | Strength after heating at 70° C. for 10 minutes [MPa] | | 0.3 | 0.5 | 0.2 | — |

In Tables 2 to 4, the base material surface temperature at treatment is a surface temperature of the resin base material at the time of the surface treatment. Furthermore, "$\delta^p$" and "$\delta^d$" rows for the resin base material indicates $\delta^p$ and $\delta^d$ described above. The measurement methods are as described above. Furthermore, "Formula (B)" rows for the resin base material each indicate the value represented by Formula (B) described above.

As is clear from Tables 2 to 4, Examples which used an isocyanate-based adhesive having Formula (A) in a specific range for a resin base material having Formula (B) in a specific range all exhibited excellent adhesiveness (initial adhesiveness), water-resistant adhesiveness, and heat-resistant adhesiveness. Among these, Examples A12 and 13, A16 and 17, A22, B3 and 4, C3 and 4, and C9, in which Formula (A) was from 20 to 35 and Formula (B) was 15 or less, exhibited even better heat-resistant adhesiveness.

On the other hand, Comparative Examples, in which at least one of Formula (A) or Formula (B) was not within the specific range, were unsatisfactory (AF100) in at least one of adhesiveness (initial adhesiveness), water-resistant adhesiveness, or heat-resistant adhesiveness.

The invention claimed is:

1. An isocyanate-based adhesive used for a surface-treated crystalline thermoplastic resin base material, the isocyanate-based adhesive comprising:
a main agent containing a urethane prepolymer; and
a curing agent containing a tri- or higher functional polyol having a weight average molecular weight of 1000 or less,
wherein:
a ratio of a mixed amount of the curing agent to a mixed amount of the main agent is, in terms of mass ratio, 1.1 or less,
the isocyanate-based adhesive contains no terpene compounds,
the isocyanate-based adhesive has a value represented by Formula (A) of 2.0 to 70 after being cured by being allowed to stand still under a condition at 23° C. and 50% RH for 3 days, and
the crystalline thermoplastic resin base material has a value represented by Formula (B) of 2.0 to 30.0:

Formula $(A)=$(JIS-A hardness)/(strength at break [MPa])×(elongation at break (%))/100

Formula $(B)=\delta^d/\delta^p+\delta^p$ where $\delta^p=\gamma^p-\gamma^{p0}$ and $\delta^d=|\gamma^d-\gamma^{d0}|$,
$\gamma^{p0}$ is a polar term of surface free energy of a crystalline thermoplastic resin base material before the surface treatment,
$\gamma^p$ is a polar term of the surface free energy of the crystalline thermoplastic resin base material after the surface treatment,
$\gamma^{d0}$ is a dispersion term of the surface free energy of the crystalline thermoplastic resin base material before the surface treatment, and
$\gamma^d$ is a dispersion term of the surface free energy of the crystalline thermoplastic resin base material after the surface treatment.

2. The isocyanate-based adhesive according to claim 1, wherein the isocyanate-based adhesive contains at least one aliphatic isocyanate modified product selected from the group consisting of isocyanurates of aliphatic isocyanates, allophanates of aliphatic isocyanates, and biurets of aliphatic isocyanates.

3. The isocyanate-based adhesive according to claim 1, wherein the isocyanate-based adhesive contains a silane coupling agent.

4. The isocyanate-based adhesive according to claim 1, wherein the isocyanate-based adhesive contains carbon black or calcium carbonate.

5. The isocyanate-based adhesive according to claim 2, wherein the isocyanate-based adhesive contains a silane coupling agent.

6. The isocyanate-based adhesive according to claim 2, wherein the isocyanate-based adhesive contains carbon black or calcium carbonate.

7. The isocyanate-based adhesive according to claim 3, wherein the isocyanate-based adhesive contains carbon black or calcium carbonate.

8. The isocyanate-based adhesive according to claim 5, wherein the isocyanate-based adhesive contains carbon black or calcium carbonate.

* * * * *